(12) United States Patent
Huf et al.

(10) Patent No.: US 11,458,908 B2
(45) Date of Patent: Oct. 4, 2022

(54) DISPLAY DEVICE AND VEHICLE

(71) Applicant: Bayerische Motoren Werke Aktiengesellschaft, Munich (DE)

(72) Inventors: Andreas Huf, Neusaess (DE); Harald Lathwesen, Mauern (DE); Martin Unger, Berlin (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 4 days.

(21) Appl. No.: 17/259,614

(22) PCT Filed: Jul. 19, 2019

(86) PCT No.: PCT/EP2019/069469
§ 371 (c)(1),
(2) Date: Jan. 12, 2021

(87) PCT Pub. No.: WO2020/020762
PCT Pub. Date: Jan. 30, 2020

(65) Prior Publication Data
US 2021/0291747 A1    Sep. 23, 2021

(30) Foreign Application Priority Data

Jul. 27, 2018    (DE) ..................... 10 2018 212 600.3

(51) Int. Cl.
*B60R 11/00* (2006.01)
*B60R 11/02* (2006.01)

(52) U.S. Cl.
CPC ... *B60R 11/0235* (2013.01); *B60R 2011/0028* (2013.01); *B60R 2011/0082* (2013.01);
(Continued)

(58) Field of Classification Search
CPC ......... B60R 11/0235; B60R 2011/0028; B60R 2011/0082; B60R 2011/0087; B60R 2011/0092
(Continued)

(56) References Cited

U.S. PATENT DOCUMENTS

| 6,256,078 B1* | 7/2001 | Ogata ................ B64D 11/0015 349/58 |
| 2015/0138449 A1* | 5/2015 | Rawlinson ....... H04N 21/41422 348/837 |
| 2018/0027689 A1* | 1/2018 | Muldowney ........... H05K 7/183 361/807 |

FOREIGN PATENT DOCUMENTS

| CN | 103538532 A | * | 1/2014 |
| CN | 103538532 A |   | 1/2014 |

(Continued)

OTHER PUBLICATIONS

International Search Report (PCT/ISA/210) issued in PCT Application No. PCT/EP2019/069469 dated Sep. 17, 2019 with English translation (four (4) pages).
(Continued)

*Primary Examiner* — Christopher S Kelley
*Assistant Examiner* — Kathleen M Walsh
(74) *Attorney, Agent, or Firm* — Crowell & Moring LLP

(57) ABSTRACT

A display device for the interior of a vehicle includes a display unit designed for optically displaying information, and a movement device swivel unit designed to swivel the display unit about a swivel axis, in particular controllably, between a non-use position parallel to a roof liner of the vehicle and a use position, in particular swivelled away from the roof liner of the vehicle, and to retain the display unit, in particular controllably, in the non-use position and/or in the use position. The swivel unit has two pairs of coupled-together first and second levers, wherein, for a swivelling of
(Continued)

the levers of a pair in relation to one another and about the first ends thereof, the first ends thereof are connected to one another such that they can swivel about respective swivel axes, and are attached directly or indirectly to the display unit. The second ends can be attached directly or indirectly to the roof liner of the vehicle.

15 Claims, 19 Drawing Sheets

(52) U.S. Cl.
CPC .................. *B60R 2011/0087* (2013.01); *B60R 2011/0092* (2013.01)

(58) Field of Classification Search
USPC .......................................... 348/837
See application file for complete search history.

(56) References Cited

FOREIGN PATENT DOCUMENTS

| | | |
|---|---|---|
| CN | 203558017 U | 4/2014 |
| DE | 10 2009 007 991 A1 | 8/2010 |
| DE | 10 2009 040 702 A1 | 3/2011 |
| DE | 102014019443 A1 * | 6/2016 |
| EP | 2 873 563 A1 | 5/2015 |
| JP | 2004149057 A * | 5/2004 |

OTHER PUBLICATIONS

German-language Written Opinion (PCT/ISA/237) issued in PCT Application No. PCT/EP2019/069469 dated Sep. 17, 2019 (five (5) pages).

German-language Search Report issued in German Application No. 10 2018 212 600.3 dated Apr. 5, 2022 with partial English translation (12 pages).

* cited by examiner

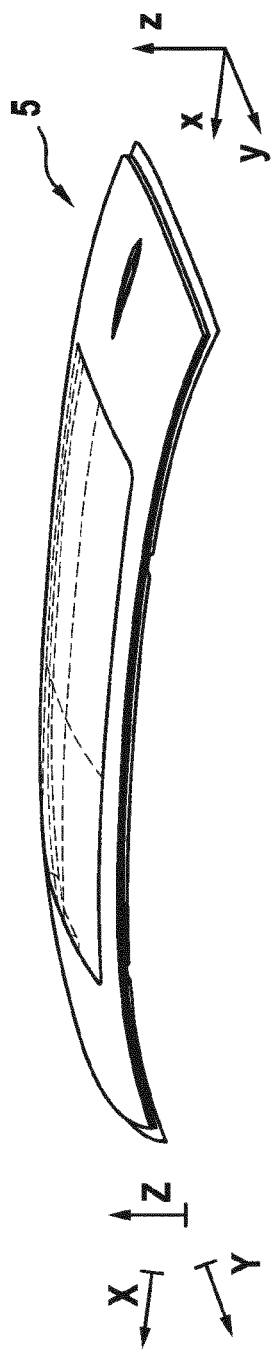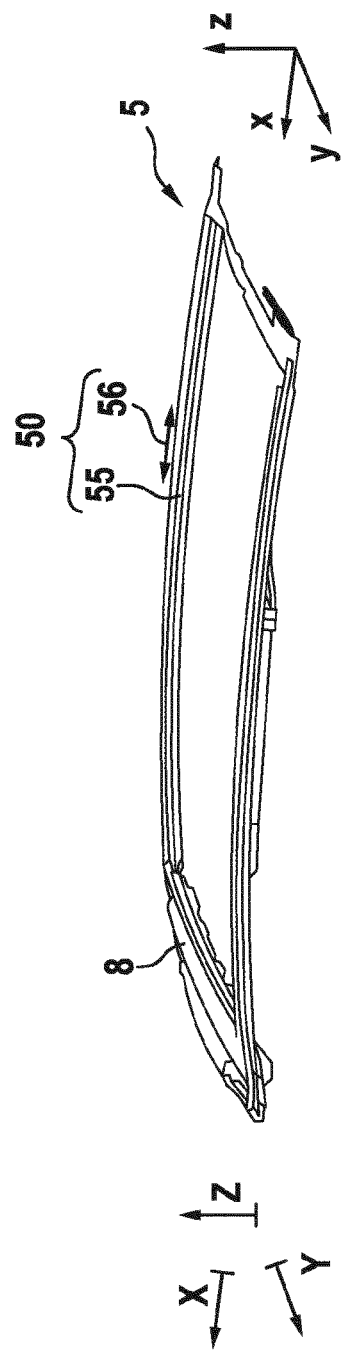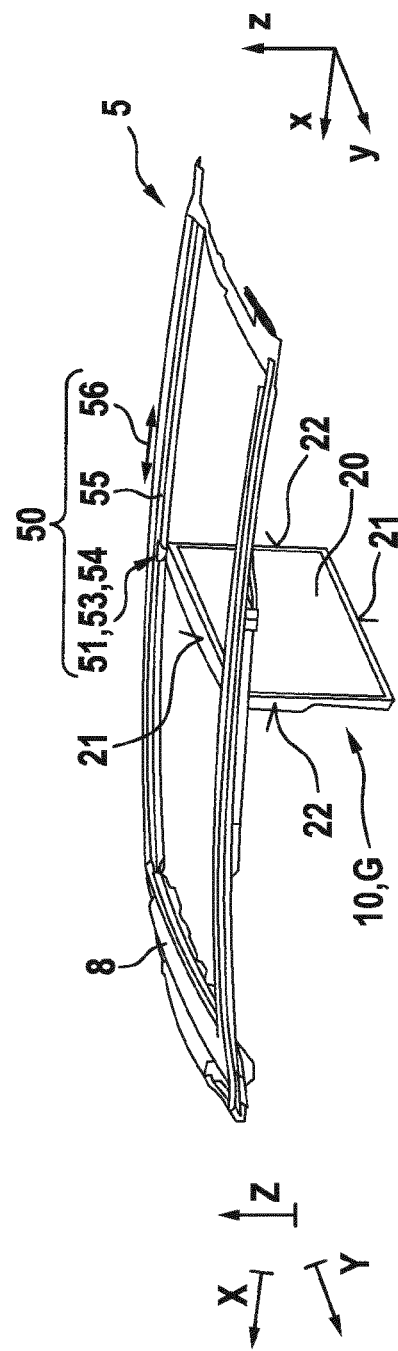

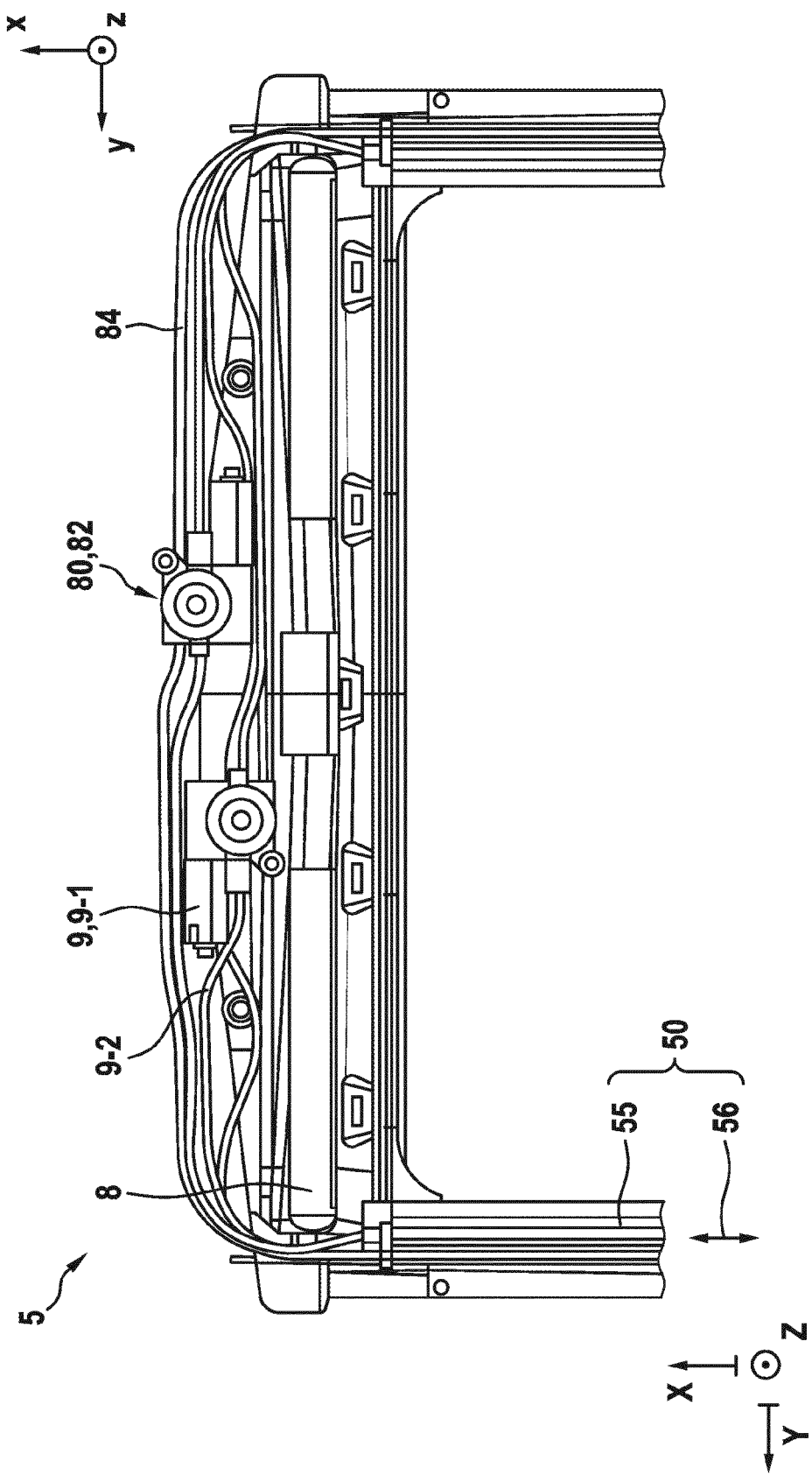

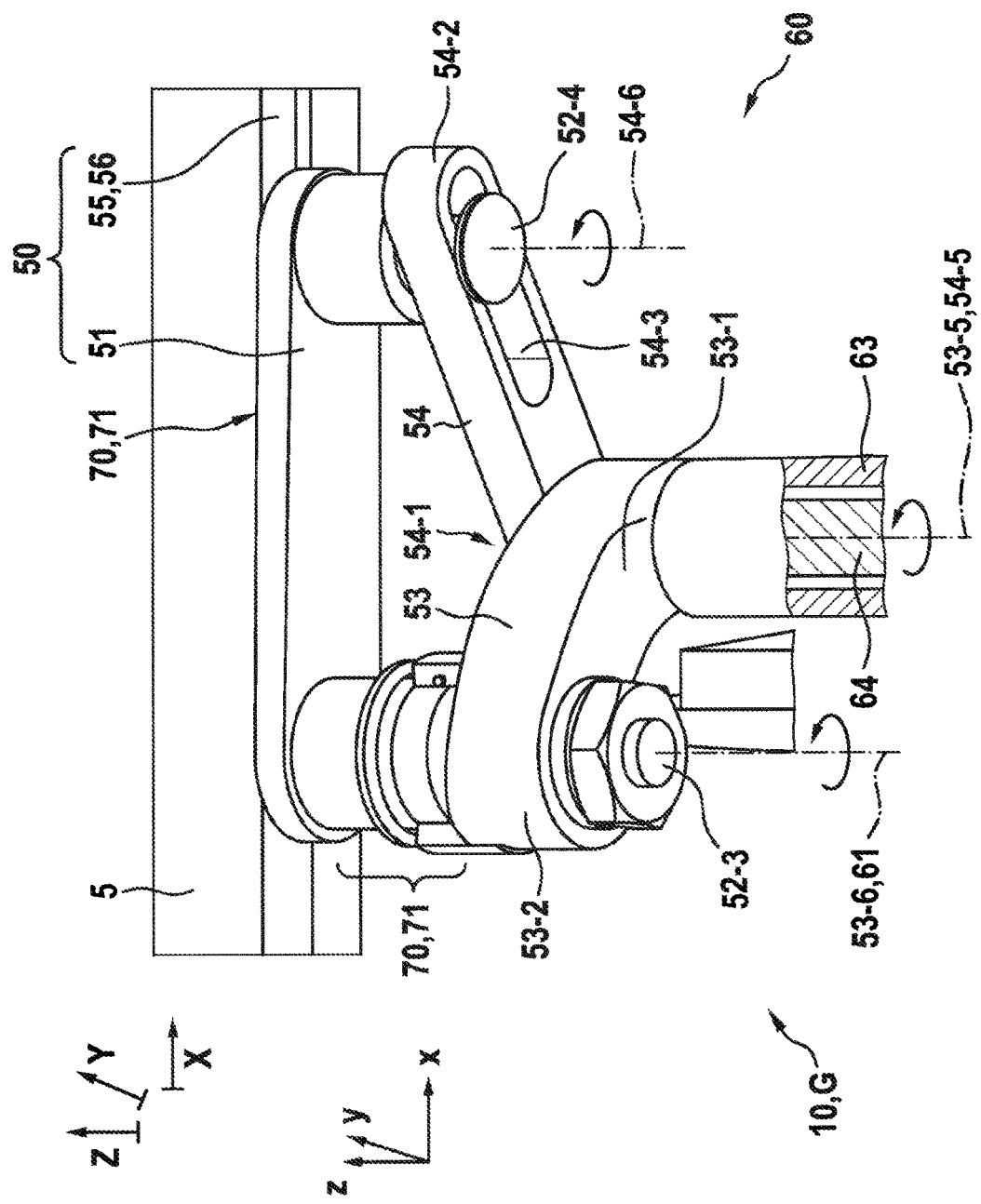

DISPLAY DEVICE AND VEHICLE

BACKGROUND AND SUMMARY OF THE INVENTION

The present invention relates to a display device for the interior of a vehicle and a vehicle per se.

It is known to mount in a vehicle and, in particular, in a general motor vehicle or passenger motor vehicle, a display device which is assigned to a seat for optically displaying information, on the inner face of the vehicle roof, for example on the roof lining. It is also known to integrate such display devices in the rear region of a vehicle into a rear face of a driver's seat or a passenger seat, for example in the region of the head restraints.

On the one hand, such known display devices have a relatively small spatial extent, wherein this is also due to the fact that the masses associated with larger displays, in particular when mounted on the roof interior, are not able to be handled in a reliable manner. On the other hand, hitherto it has not been possible to give safety features sufficient consideration.

The object of the invention is to provide a display device for the interior of a vehicle and a vehicle per se, in which by simple means a reliable, stable and simple handling is possible, even of larger and heavier display units, and safety features, for example in connection with accidents, may be given more consideration.

The object of the invention is achieved by a display device and by a vehicle according to the independent claims. Advantageous developments in each case form the subject matter of the dependent claims.

According to a first feature of the present invention, a display device is provided for the interior of a vehicle and, in particular, of a motor vehicle or passenger motor vehicle, comprising a display unit designed for optically displaying information, and comprising a swivel unit designed to swivel the display unit about a swivel axis, in particular controllably, between a non-use position parallel to a roof liner of the vehicle and a use position, in particular swiveled away from the roof liner of the vehicle, and to retain said display unit, in particular controllably, in the non-use position and/or in the use position. According to the invention, the swivel unit comprises two pairs of coupled-together first and second levers—for a swiveling of the levers of a pair in relation to one another and about the first ends thereof—the first ends thereof are connected to one another such that they can swivel about respective swivel axes and are attached directly or indirectly to the display unit. The second ends of the levers are/can be attached directly or indirectly to the roof liner of the vehicle.

By these measures and, in particular, by the cooperation of the levers of the lever pairs, the possibility is created of handling display devices with a larger and thus heavier display unit, which were hitherto difficult to handle due to their greater mass, in a simple, stable and reliable manner in the interior of a vehicle, wherein safety features may also be given more consideration, for example during an accident, by the inertia of the display device, for example, combined with the possibilities of movement due to the lever pairs, being able to be used for a passive deflection of the display unit out of the passenger compartment, which is driven by inertia.

A first end of one respective first lever of a pair of levers may be attached as a swivel lever fixedly in terms of rotation to the display unit and connected thereto. The swivel levers serve, in particular, for bearing and guiding the display unit during the actual swiveling movement.

In this case a particularly space-saving arrangement is produced when the swivel lever is attached, for example, at or in an intersecting region of a transverse edge and a longitudinal edge of the display unit, this intersecting region facing the rear of the vehicle in a mounted state of the display device in the vehicle and/or in the non-use position.

In order to obtain a swiveling movement which is particularly stable, in a further embodiment of the display device according to the invention it is provided that a first end of one respective second lever of a pair is rotatably attached as a coupling lever to the display unit and connected thereto and to the first end of an assigned first lever of the pair. By these measures, in particular, a stabilized lateral guidance is achieved during the swiveling process.

According to a further embodiment of the display device according to the invention, a further stabilizing of the swiveling movement may be achieved when a second end of one respective first lever of a pair and/or a second end of one respective second lever of a pair are configured in each case such that they can swivel about one respective swivel axis.

In this case, it is particularly advantageous if this swivelable attachment for the stabilizing is implemented via a pin or journal which is respectively fixed or rotatably mounted on the respective second end, for example with swivel axes oriented parallel to one another, with swivel axes oriented parallel to the swivel axes of the first ends of the levers, with swivel axes oriented parallel to the swivel axis of the display unit and/or parallel to the transverse edges of the display unit.

The high level of parallelism of the different swivel axes, wherein different swivel axes may also coincide with one another, further increases the lateral stability during the swiveling movement and prevents, for example, a deflection into movement patterns which pass out of the swivel plane.

The swivel axis at the second end of one respective first lever may coincide with the swivel axis of the display unit. However, other configurations are also contemplated.

In a further exemplary embodiment of the display device according to the invention, one respective second lever has a longitudinal direction of extent and a slot oriented in the longitudinal direction of extent for receiving a pin assigned to the second end of the lever. In this case, the pin is displaceable in the slot in the main direction of extent and is rotatable about a pin axis defining a swivel axis assigned to the second end of the second lever, in particular perpendicular to the main direction of extent.

By these measures, more complex movement patterns may be produced when swiveling the first and second levers relative to one another. The slot in this case may serve as a sliding guide—in particular for the pin which is respectively provided. Moreover, by the choice of the slot in terms of dimension and length, the relative swiveling movement may be defined by the corresponding stops at the end of the slot.

In a further alternative embodiment of the display device according to the invention, one respective second lever is attached fixedly in terms of rotation with its first end to a shaft defining at least the swivel axis for the first end of the second lever.

The corresponding mounting of this end may be carried out, for example, at one end of the shaft. In this case it is also contemplated to insert both ends of the shaft together, for example the two second levers of the two pairs or lever pairs being connected together fixedly in terms of rotation and in identical orientation to one another by the two ends of the shaft. In this manner, a particularly stable and concerted movement of the two second levers of the pairs of levers may be achieved.

In this case, it may be additionally or alternatively provided that one respective first lever is attached fixedly in terms of rotation by its first end to a hollow shaft defining at least the swivel axis of the first end or for the first end of the first lever.

It is contemplated that in this case the first levers are attached with their first ends to an end of the hollow shaft and additionally or alternatively the two ends of the hollow shaft and the two first levers of the two pairs of levers are connected together fixedly in terms of rotation and in identical orientation at their first ends and to the display unit. In this manner a corresponding mechanical coupling of the first levers of the pairs of levers or lever pairs is implemented.

Moreover, it may be provided that at least one part of the shaft is rotatably mounted in at least one part of the hollow shaft, so that their axes coincide and form the swivel axes of the or for the first ends of the first and second levers of the pairs of levers. The encompassing of the shaft by the hollow shaft at the first ends of the second levers provides a particularly stable movement procedure during the swiveling process.

The measures described above relate, in particular, to the swiveling movement per se. The advantages set forth relate not only to the positioning of the display unit in the vehicle interior in normal use but also a movement of the display unit in the event of danger, i.e. when the properties of the inertia of the display unit come into play. This is described in more detail below.

Initially, however, features are described which relate to a translational positioning of the display unit, i.e. a displacement in the longitudinal direction of extent of the vehicle.

In this connection it is particularly advantageous if, according to a further embodiment of the display device according to the invention, the display device is configured in each case with a guide element assigned to one lever pair, wherein the second ends of the levers of the assigned pair of levers are attached to one respective guide element at a predetermined spacing and so as to be able to swivel about the swivel axes. In this manner, an indirect mechanical connection is produced between the second ends of the levers in use, namely with the roof liner or a construction of the roof liner.

This has particular advantages in the simplification of a possible translational movement, since in a corresponding movement procedure the individual second ends of the levers do not have to be taken into consideration, but instead only the guide element to which these two ends are attached.

Particularly simple conditions are present when the guide elements, in particular, are configured to be equal or substantially equal, as slides and/or designed for a sliding movement, for example, in one respective guide rail to be provided.

Accordingly, for creating the possibility of a translational movement it is particularly advantageous if the display device according to the invention in each case has a guide rail which is assigned to a guide element and which is configured for attaching to the roof liner, with a guide track for receiving the assigned guide element and for the movement thereof in and along the guide track.

For simplifying the conditions it may be provided to configure the guide rails as a pair, equal or substantially equal to one another, linear or substantially linear, oriented parallel to one another, oriented flush with one another, in particular relative to their respective first and second ends, in the mounted state of the display device on the assigned vehicle, attached to a roof liner or in the region of a roof liner and/or in the mounted state of the display device on the assigned vehicle oriented parallel to a longitudinal direction of extent of the vehicle.

Whilst in principle all forms of display devices with the configuration according to the invention may be moved between non-use positions and use positions in normal operation and in the event of an accident, particularly clear conditions result when the display unit forming the basis of the display device is configured with a substantially rectangular design and in the mounted state of the display device on the assigned vehicle with transverse edges oriented parallel to a transverse direction of extent of the vehicle and/or is configured in the mounted state of the display device on the assigned vehicle with longitudinal edges oriented parallel to a longitudinal direction of extent of the assigned vehicle.

Moreover, it may be advantageous if alternatively or additionally the first levers and/or the second levers in each case and, in particular, relative to one another are or are to be configured as a pair, equal or substantially equal to one another, with equal length, linear or substantially linear, oriented parallel to one another and/or oriented flush with one another.

In principle, it is contemplated to configure the guide elements, the coupling lever and the guide rails such that via corresponding stop devices, a folding out and folding in and/or a positioning of the display unit of the display device according to the invention may be carried out by hand. Purely manually or passively actuatable display devices according to the invention are contemplated.

For increasing the comfort, however, in preferred embodiments of the display device according to the invention a drive unit can be or is to be configured, the drive unit being configured for, in particular, controlled swiveling of the display unit about the swivel axis of the display unit and, in particular, having a first controllable drive and a drive means mechanically coupled or couplable thereto and to the second levers.

The drive means may be configured, for example, in the manner of a gear mechanism and for swiveling the second levers and/or the shaft of the second levers or for the second levers about the swivel axis thereof.

Alternatively or additionally, a drive may also be used for the translational movement, i.e. for adjusting the display unit of the display device in the longitudinal direction of the vehicle in the mounted state.

Thus in a further advantageous embodiment of the display device according to the invention, it is provided that the drive unit is designed for driving the guide elements for a common, equal and/or translational movement in one respective guide rail.

It is accordingly contemplated that the drive unit is configured with a controllable drive and with a drive means mechanically coupled or couplable thereto and assigned to the guide elements, in particular in the form of a brush cable or helix cable, which is designed for, in particular, a meshing engagement by the guide elements for the movement thereof.

In this case, in particular, it is possible to use a drive as may be used in sliding roofs, in order to drive the corresponding roof elements in a corresponding frame.

In particular with the use of display devices which protrude into the passenger compartment of the interior of the vehicle when a use position is adopted, safety features are of particular importance, in particular when using large or heavy display units. In the event of an accident, a collision of the display device with a passenger in the interior of the vehicle is to be avoided as far as possible.

In order to achieve this, according to a further feature of the present invention, specific safety mechanisms may be incorporated in the display device according to the invention.

Thus it is contemplated to configure a friction clutch and/or brake, in particular with a backstop, on or in a guide element, between a guide element and an assigned guide rail, in the region of a drive of the second levers and/or in the region of the first and/or second levers themselves and, in particular, with a predetermined holding force as a target holding force.

The arrangements are selected such that when the target holding force is exceeded, for example, one respective guide element is moved following the acting force in one respectively assigned guide rail and/or that a swiveling movement results, following the acting force back into the non-use position of the display unit.

This means that in the event of an accident, i.e. for example an impact, the maximum holding force or braking force of the clutch or the brake is exceeded due to the inertia, so that for example the guide elements are unlocked and move along the guide tracks of the guide rails and thus do not obstruct the movement of a passenger in the interior.

Thus in this connection it is a purely translational deflection of the display and thus a protection of the occupant is possible by a purely longitudinal movement of the display in the vehicle longitudinal direction of extent.

If required, additionally or purely alternatively, via the corresponding mechanical coupling of the pairs of levers to the display unit it results that the display unit swivels back and thus is deflected out of the passenger compartment, i.e. out of the interior of the vehicle, from a use position into a non-use position, whereby a collision with the passenger may be prevented with a greater degree of reliability. In this case, in particular, the use of a corresponding friction clutch in a drive shaft may be useful.

In these mechanisms, therefore, in particular the inertial influences which come into play in the case of an impact are used.

In this case, the target holding force and/or the target holding torque may have values which, for example, are in the region of approximately 1 kN for the target holding force and/or in a range which corresponds to an acceleration in the region of approximately 10 g.

According to a further feature of the present invention a vehicle is also accordingly provided. This vehicle has a body, an interior formed by the body, with a roof liner and a display device attached to or in the roof liner and designed according to the invention.

In a particularly preferred embodiment of the vehicle according to the invention, two guide rails of the display device are attached to or in the roof liner such that they extend flush with equal length and parallel to one another in a longitudinal direction of extent of the vehicle, in particular on or—relative to a transverse direction of extent of the vehicle—in external regions of the roof liner.

Moreover, accordingly two guide elements of the display device are received in the guide rails, such that a corresponding first transverse edge of the display unit of the display device, the first guide elements being attached to the region thereof, is arranged parallel to the transverse direction of extent of the vehicle and relative to the longitudinal direction of extent of the vehicle in the direction of a side facing the rear of the vehicle.

In a preferred embodiment, the display device according to the invention may be configured together with a compartment or a cassette for a roof roller blind of a panorama roof or the like. In this case, it is contemplated that the guide rails of the roof roller blind are also used as guide rails for the guide elements of the display device. For improved separation of the movement patterns of the roof roller blind and the display device, however, separate guide rails are preferred.

Further details, features and advantages of the invention are disclosed in the following description and the figures.

BRIEF DESCRIPTION OF THE DRAWINGS

FIGS. 9 to 15 show in different schematic and optionally sectional perspective side views and plan views embodiments of the display device according to the invention together with a vehicle according to the invention and a roof roller blind configured therein.

FIGS. 20 to 22 show in a schematic and perspective side view a practical embodiment of the display device according to the invention regarding the configuration of the pairs of levers and the cooperation thereof.

Figure 1:
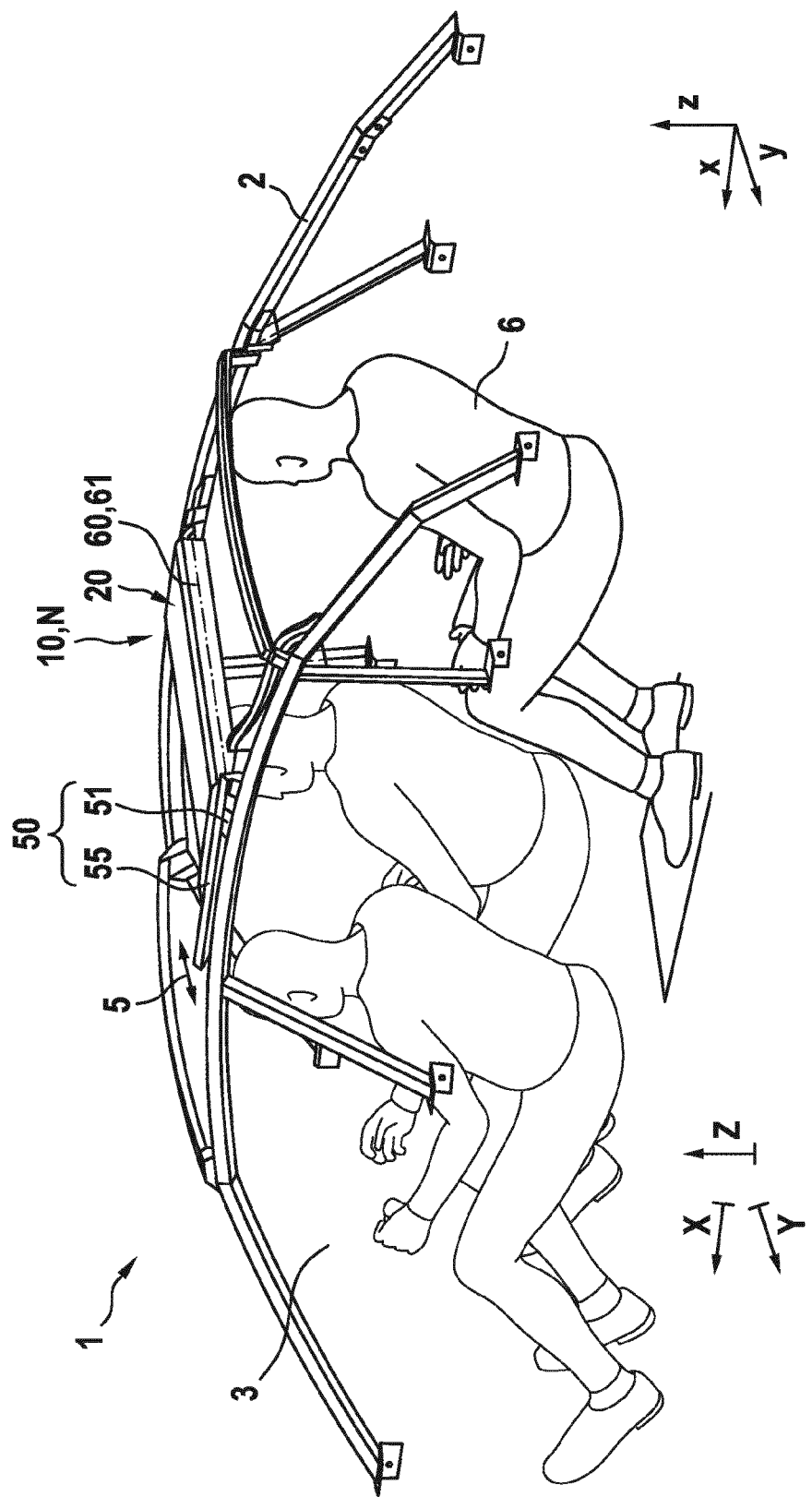
FIGS. 1 to 4 show in a schematic and perspective side view an embodiment of the vehicle according to the invention which is provided with an embodiment of the display device according to the invention, wherein the display unit is arranged in different positions in the interior of the vehicle.

Exemplary embodiments and the technical background to the invention are described in detail hereinafter with reference to FIGS. 1 to 22. Elements and components which are identical and equivalent, and which act in an identical and equivalent manner, are denoted by the same reference numerals. The detailed description of the denoted elements and components is not repeated in every case of their occurrence.

The features and further properties shown may be isolated from one another in any manner and combined together in any manner without departing from the scope of the invention.

DETAILED DESCRIPTION OF THE DRAWINGS

FIGS. 1 to 4 show in a schematic and perspective side view an embodiment of the vehicle 1 according to the invention which is provided with an embodiment of the display device 10 according to the invention, wherein the display unit 20 of the display device 10 is arranged in different positions N, G in the interior 3 of the vehicle 1.

In all of the figures, and also in FIGS. 1 to 4, the vehicle 1 is shown schematically by components of a body 2 which surround an interior 3 of the vehicle 1 and define a roof liner 5.

The respective vehicle 1 extends in a longitudinal direction of extent X parallel to the x-direction, in a transverse direction of extent Y parallel to the y-direction and in a vertical direction Z parallel to the z-direction, which are defined by the respectively specified trihedral coordinates.

Figure 2:
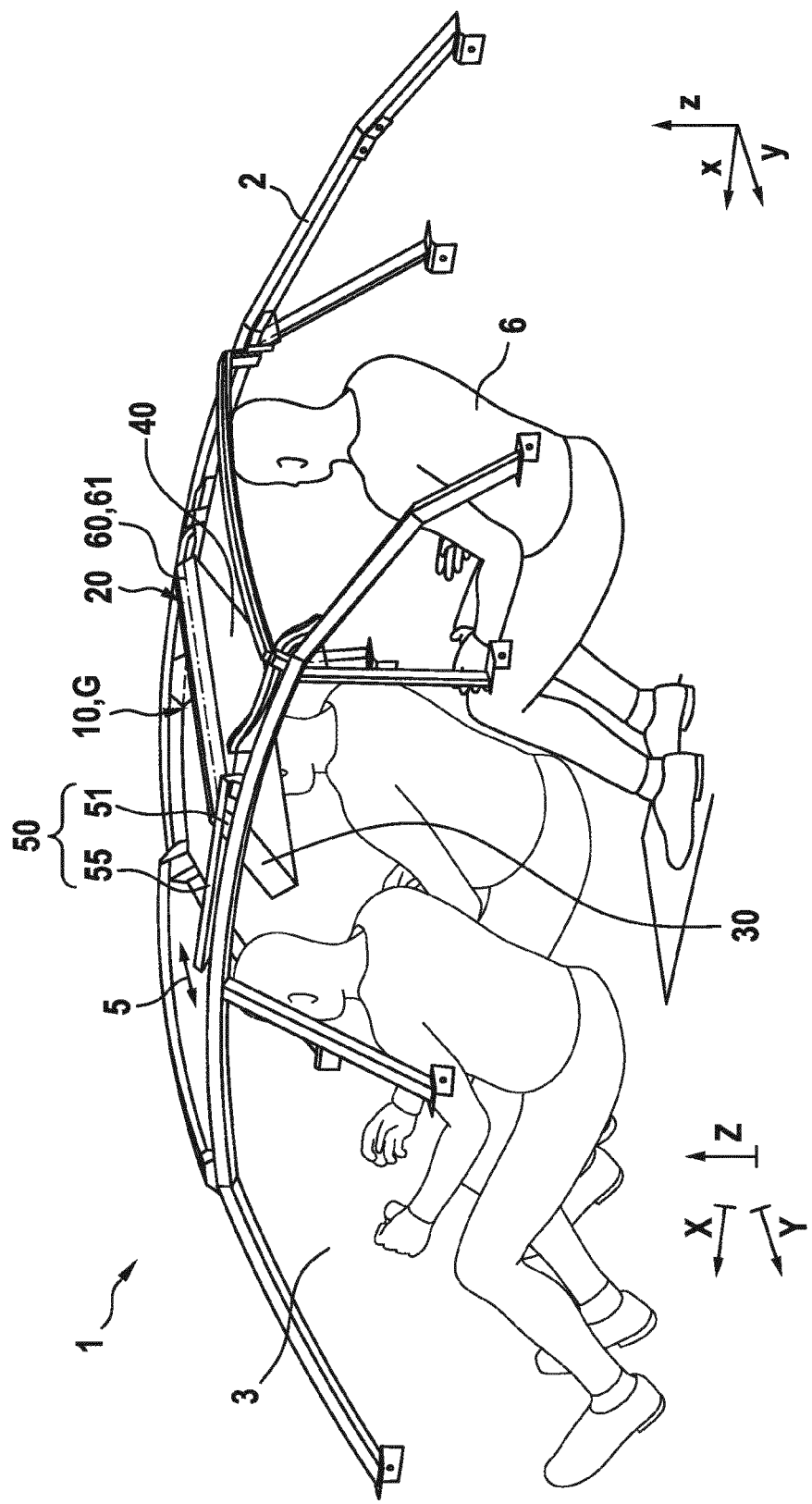
Figure 3:
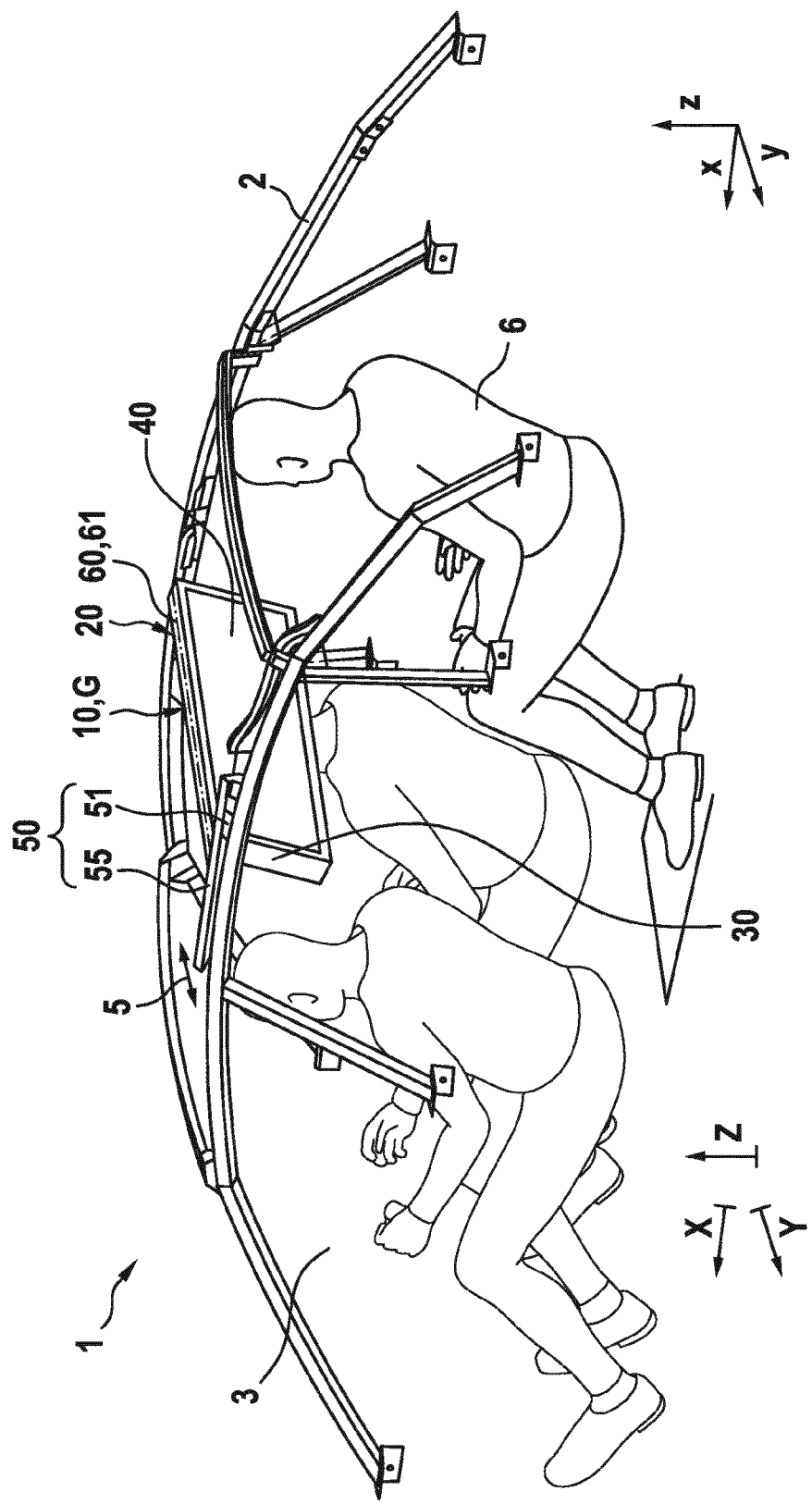
Figure 4:
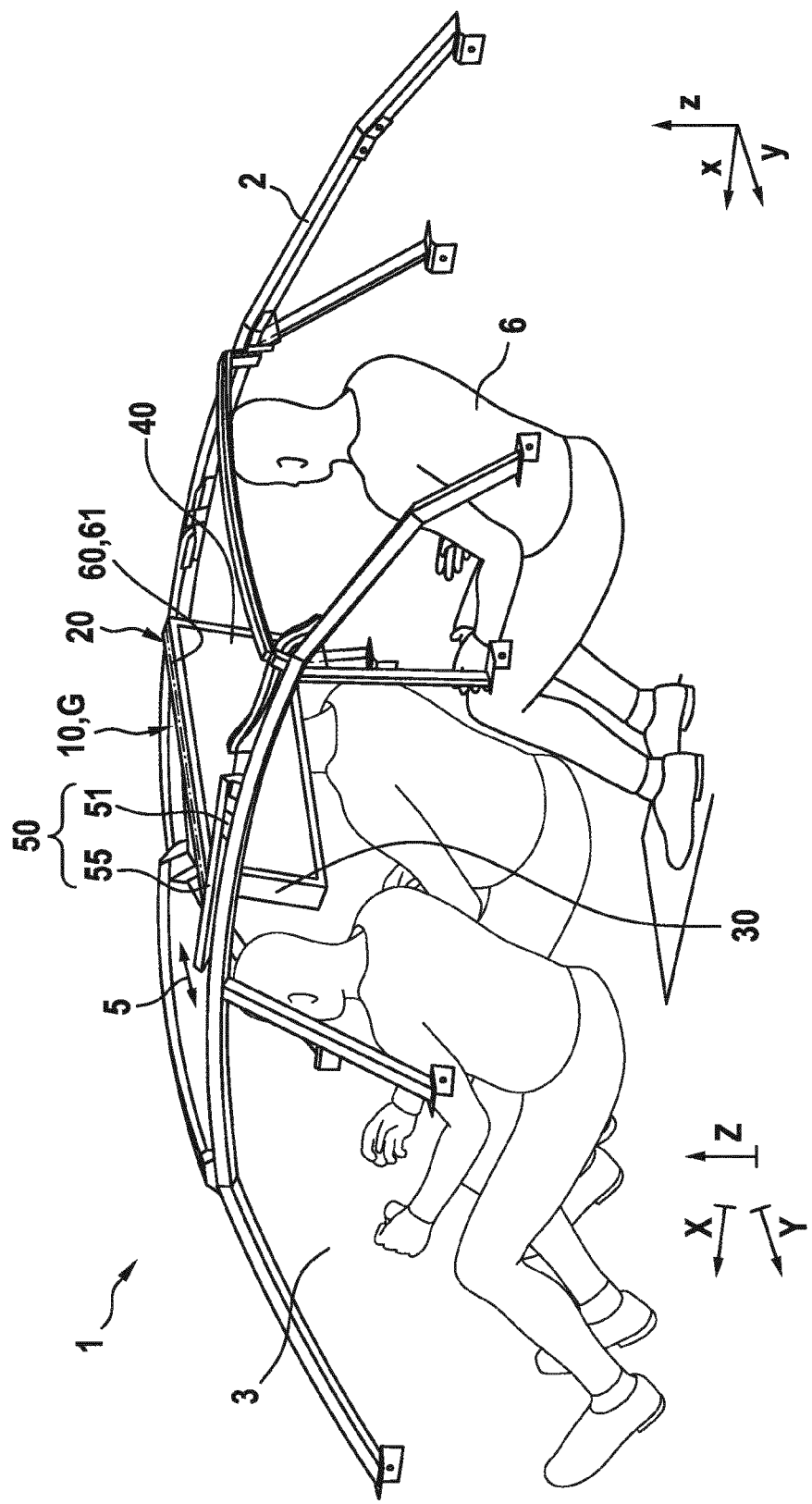
Figure 5:
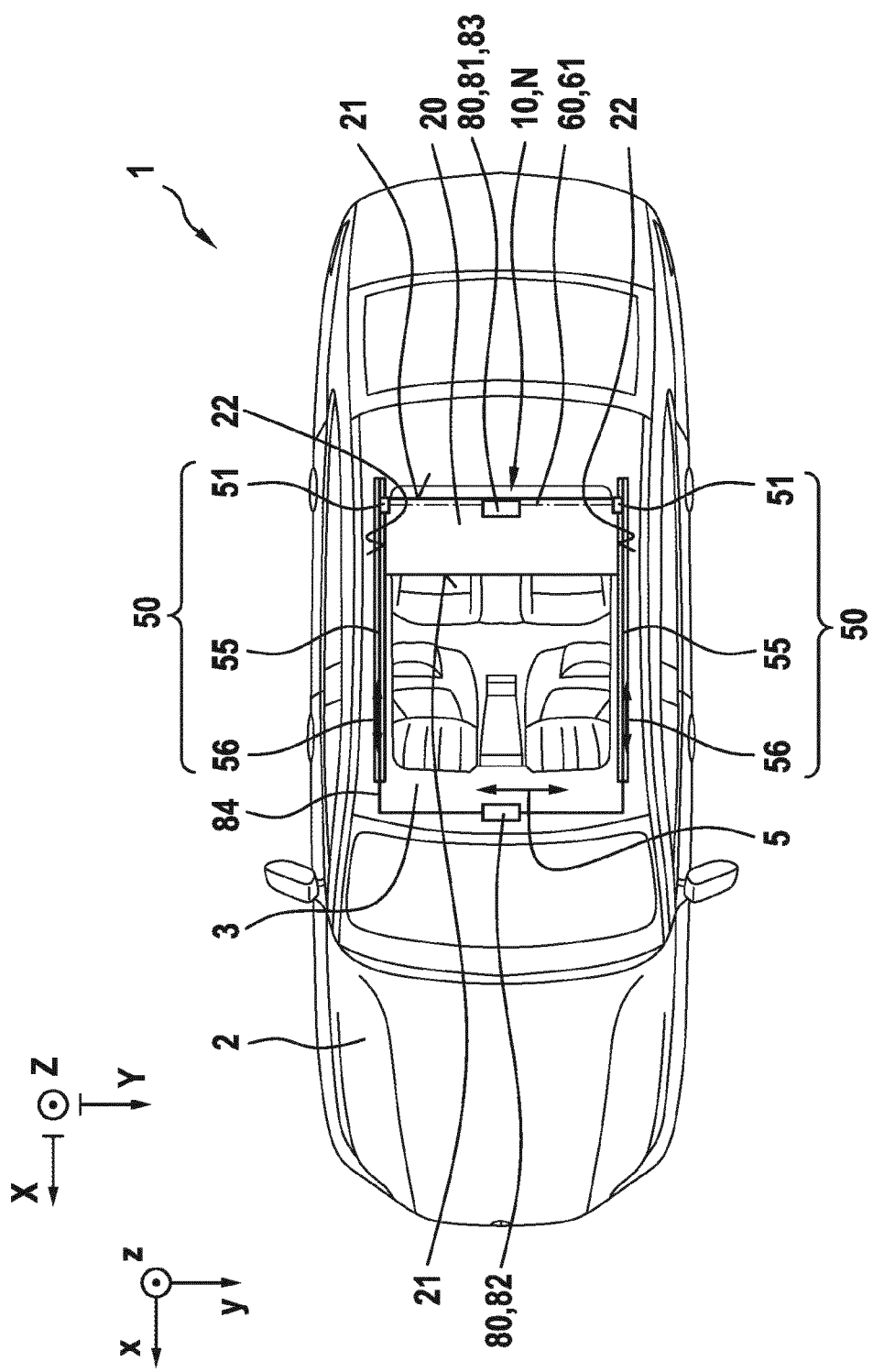
FIGS. 5 to 8 show in a schematic and perspective plan view a further embodiment of the vehicle according to the invention which is provided with an embodiment of the display device according to the invention, wherein the display unit is arranged in different positions in the interior of the vehicle.
Figure 6:
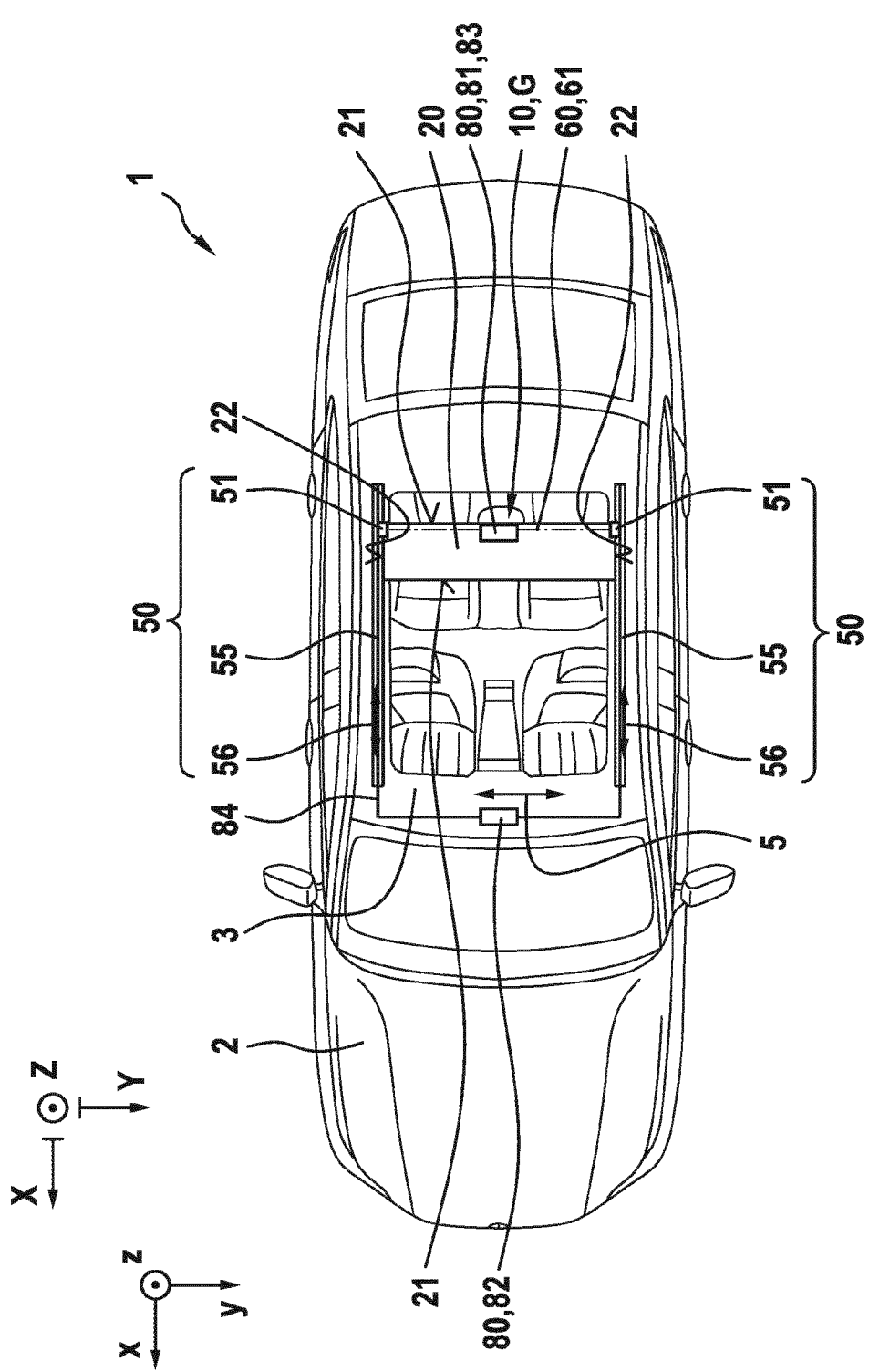
Figure 7:
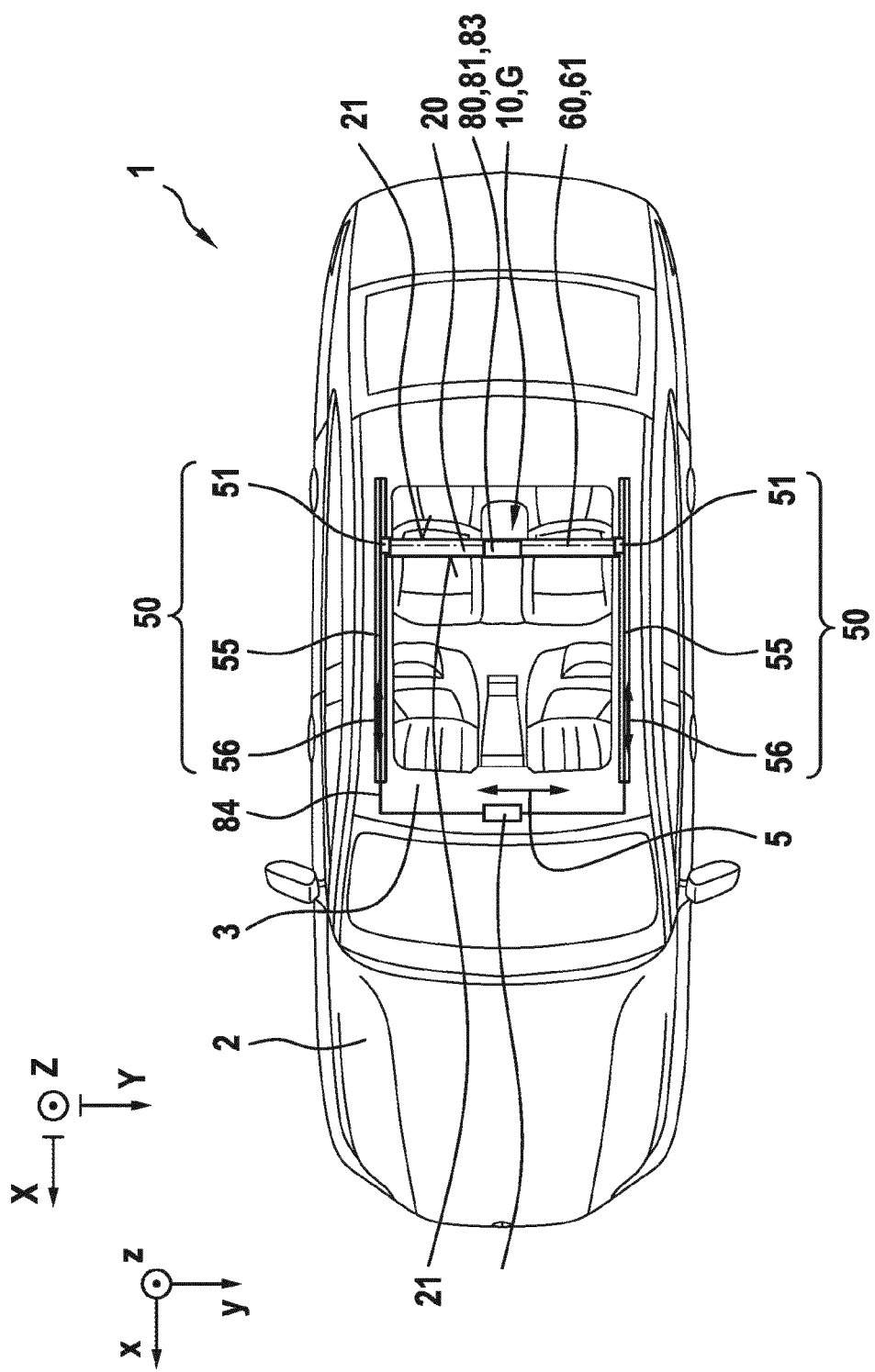
Figure 8:
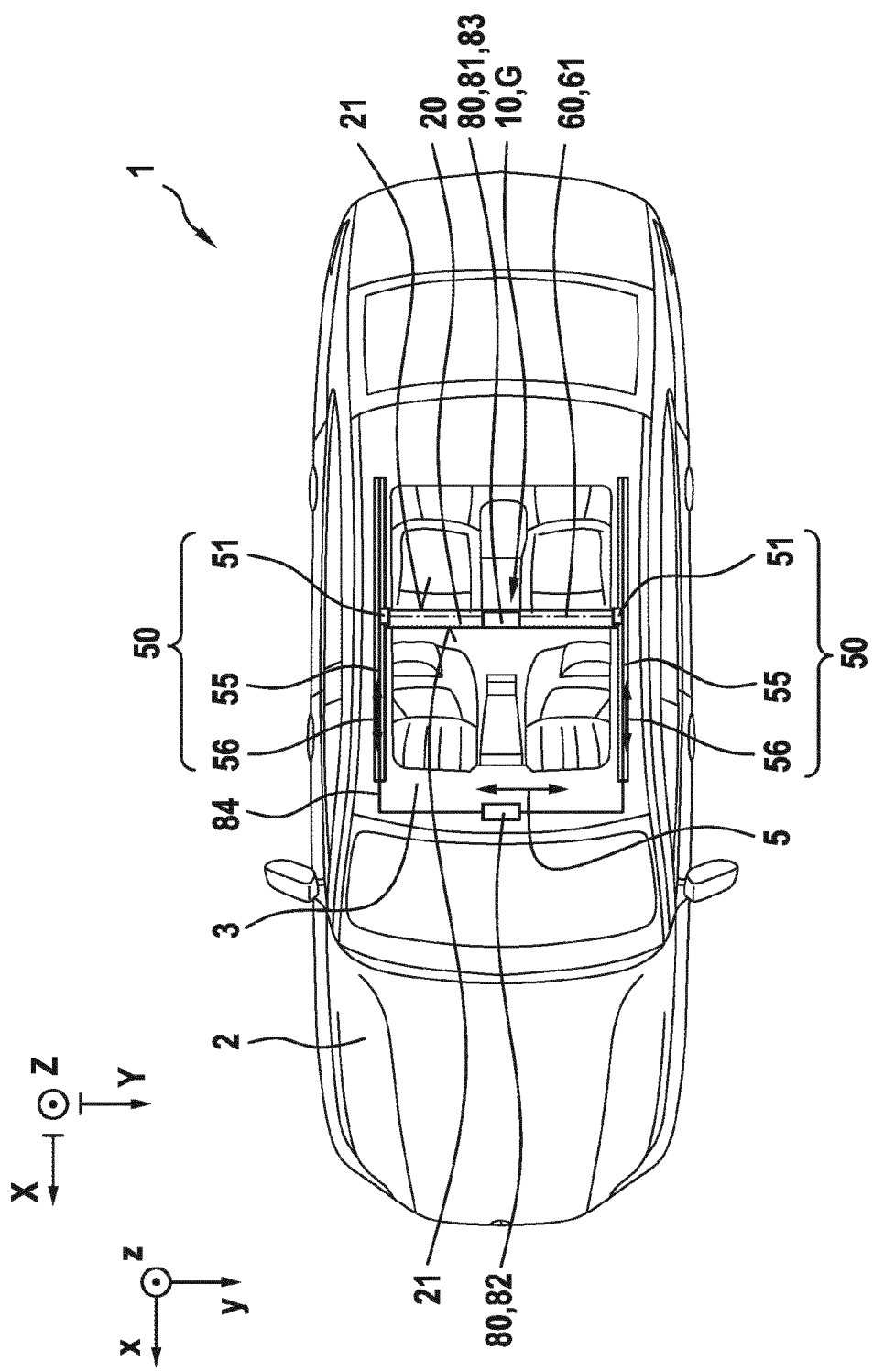

A respectively shown display device 10 is formed in the views of FIGS. 1 to 4 by the actual display unit 20, for example, with a support 30 which bears a display element 40, for example a monitor or a screen, as is shown in FIGS. 2 to 4. The display unit 20 in this case is of substantially rectangular design with longer transverse edges 21 parallel to the transverse direction of extent Y of the vehicle 1 and with shorter longitudinal edges 22 parallel to the longitudinal direction of extent X of the vehicle 1.

Moreover, a component of the display device is a movement unit 50. This movement unit is formed, in the embodiment shown in FIGS. 1 to 4, from two guide rails 55, two guide elements 51 and two pairs of first and second levers 53, 54, wherein the second levers due to their size may be explicitly identified only with further reference to FIGS. 9 to 12, 16, 17 and 19 to 22.

In this embodiment the guide rails 55 are configured identically, the guide rails have a linear design with an equal length and are arranged parallel to one another and flush on the roof liner 5, and in each case form a guide track 56.

In the embodiment of FIGS. 1 to 4 the guide rails 55 extend in the longitudinal direction of extent X of the vehicle 1. The guide rails are located in the transverse direction of extent Y spaced apart from one another on the sides of the roof liner 5, i.e. in particular in the transition from the roof to the vehicle side.

The guide elements 51 are configured as slides and are designed to be received in one respective guide rail 55 and moved therein or to move along the respective guide track 56.

In the region of a first transverse edge 21 of the display unit 20, the guide elements 51 are attached to the display unit 20 so as to be rotatably mounted, namely via the first and second levers 53, 54, shown explicitly in the further figures, and the first ends 53-1, 54-1 thereof and the rotatable mounting thereof to one another, such that a swivel axis or rotational axis 61 of the display unit 20 is defined thereby, about which the display unit 20 may be swiveled by means of a swivel unit 60, which has been formed, in terms of its angle relative to the roof liner 5 and, in particular, between a non-use position N and a use position G.

The mounting of the guide elements 51 is carried out, in particular, on the transverse edge 21 of the display unit 20 which is located on a side which is assigned to the rear of a vehicle 1 and which when mounting the display unit 20 on the vehicle 1 faces the side of the rear of the vehicle 1. The mounting of the guide elements 51 is preferably carried out in the vicinity of the opposing longitudinal edges 22 of the display unit 20 and thus, in particular, effectively in the intersecting region of the longitudinal edges 22 and the transverse edges 21.

With the arrangement thus selected of the guide elements 51 and guide rails 55 with the guide tracks 56, on the one hand, and the pairs of levers 53, 54 with the corresponding arrangement on the guide elements 51 and on the display unit 20, on the other hand, when moving the guide elements 51 in the guide rails 55, the possibility is created of a translational movement and, by the swiveling via the pairs of levers 53, 54, a movement between a non-use position N and one or more use positions G by swiveling the display unit 20, wherein different inclination angles to the roof liner 5 and/or different lateral positions along the guide rails 55 may be adopted, and thus when mounting in a vehicle 1 in the longitudinal direction of extent X of the vehicle 1.

In FIG. 1 the display unit 20 is located in a non-use position N, namely in a state in which the display unit is oriented substantially parallel to the roof liner 5.

In the transition to the intermediate state shown in FIG. 2, the display unit 50 is moved by corresponding movement of the guide elements 51, 52 in the guide rail 55 in a translational manner and by swiveling the roof liner 5 into the passenger compartment 3 into a first use position G.

In the transition to the intermediate state shown in FIG. 3, the display unit 20 is swiveled away by a greater angle from the roof liner 5 and transferred into a further use position G oriented more vertically.

In the transition to the intermediate state shown in FIG. 4, by a purely translational movement of the guide elements 51 a pure displacement is then effected without altering the inclination angle so that the viewing distance of an occupant 6 of the vehicle 1 seated at the rear may be adapted and in particular increased. In this case, in the transition to the intermediate state shown in FIG. 4, the display unit has been moved into the front region of the vehicle 1.

The structure of the display device 10 described above with the display unit 20 and movement device 50 is also illustrated further on the basis of the further FIGS. 5 to 18.

FIGS. 5 to 18 show in a schematic and perspective plan view a further embodiment of the vehicle 1 according to the invention which is provided with an embodiment of the display device 10 according to the invention, wherein the display unit 20 is arranged in different positions N and G in the interior 3 of the vehicle 1.

In FIGS. 5 to 8 together with the swivel unit 60 for swiveling about the swivel axis 61 and the movement device 50 with the guide element 51, the guide rail 55 with the guide track and swivel unit 60 as the component thereof, also explicitly shown are a drive unit 80 with a first drive 81, for example a motor, and a gear mechanism as first drive means 83 for swiveling about the swivel axis 61 and with a second drive 82 and brush cables or helix cables as second drive means 84 for displacing the guide elements 51 configured as slides in the guide rails 55, wherein the guide rails 55 in each case have a guide track 56 in the longitudinal direction of extent X of the vehicle 1 and are mounted on the roof liner 5.

FIGS. 9 to 15 show in different schematic and optionally sectional perspective side views and plan views embodiments of the display device 10 according to the invention together with a vehicle 1 according to the invention and a roof roller blind 8 configured therein.

The roof roller blind 8 together with a cassette-like recess is configured in the region of the roof liner 5. The track of the actual roller blind is guided in guide rails 55 via corresponding guide elements and a drive 9 with a motor 9-1 and a drive means 9-2, for example in the form of a brush cable or helix cable, in order to cover or open up fully or partially the corresponding panorama window.

Figure 9:
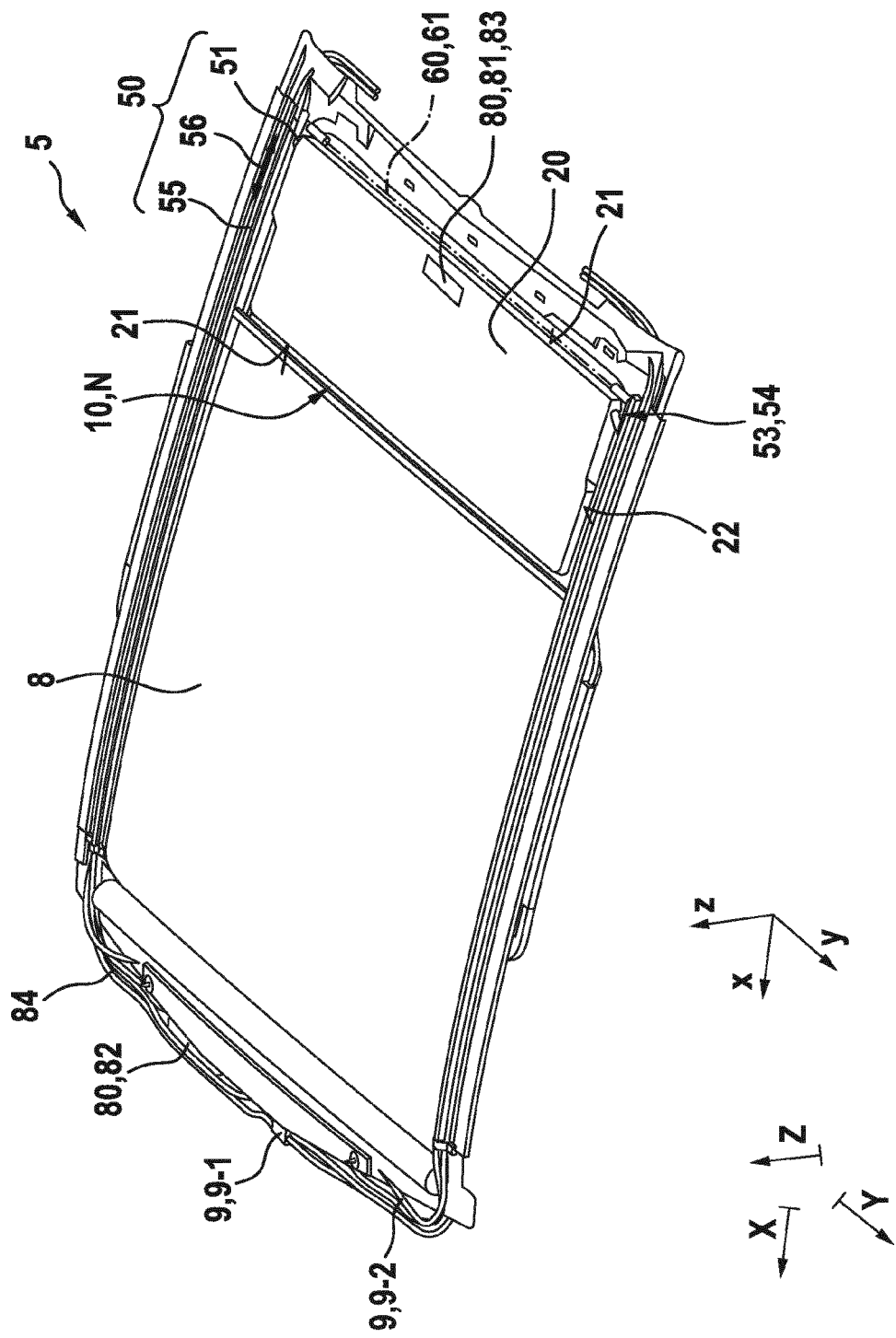

Via an additional or widened recess in the cassette of the roof roller blind 8, as shown in FIG. 9, the display device 10 according to the invention may be accommodated in the non-use position N of the display unit 20. A second drive 82 of the drive unit 80 of the display device 10 is also configured on the side with the roller blind drive 9 remote from the rear, namely for moving the guide elements 51 configured as slides in the guide rail 50 for the purely translational displacement of the display unit 20, provided this display unit is swiveled away out of the non-use position N parallel to the roof liner 5. For example, a brush cable or helix cable is used as drive means 84 for the movement of the guide elements 51.

FIG. 9 shows the display device 20 in the case of a non-use position N.

Figure 14:
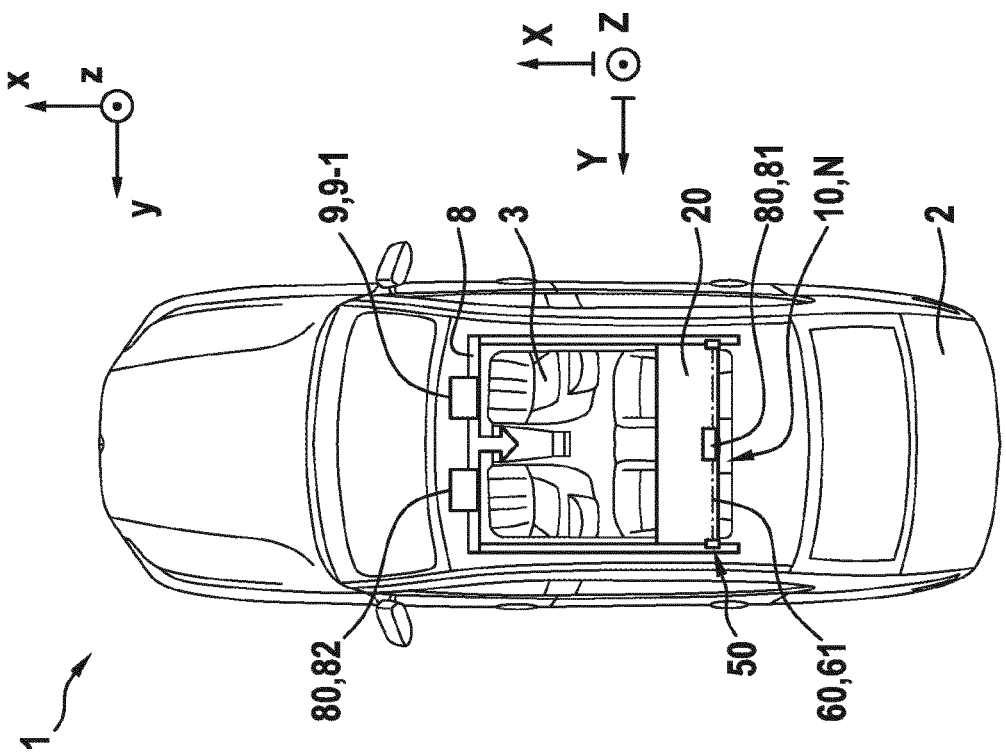
Figure 13:
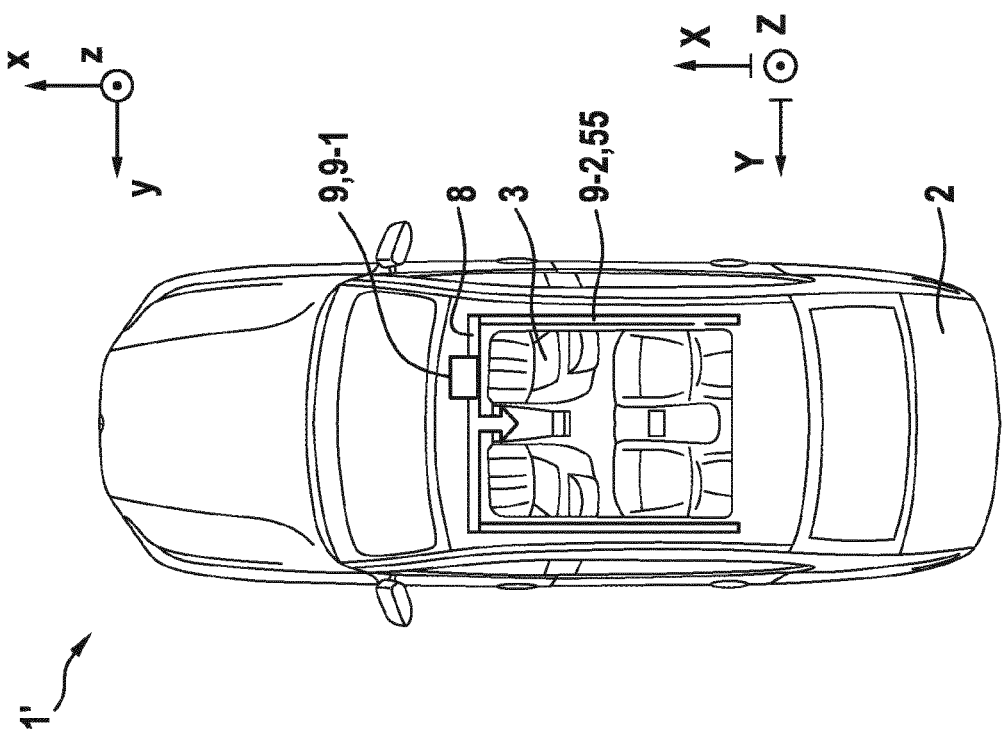
Figure 16:
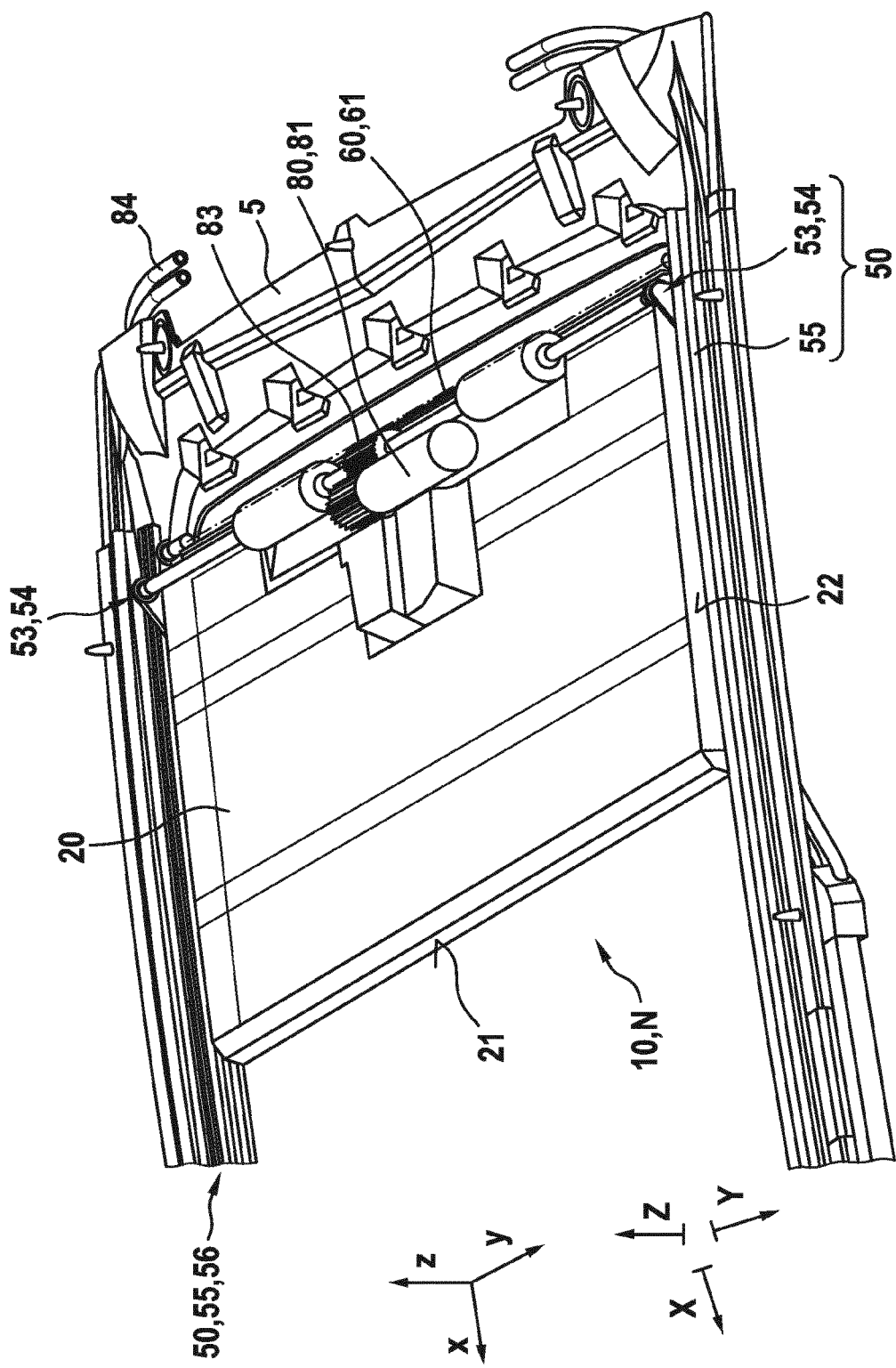
FIGS. 16 to 19 show in schematic and perspective side views features of a display device according to the invention together with a drive for performing the swiveling movement.
Figure 17:
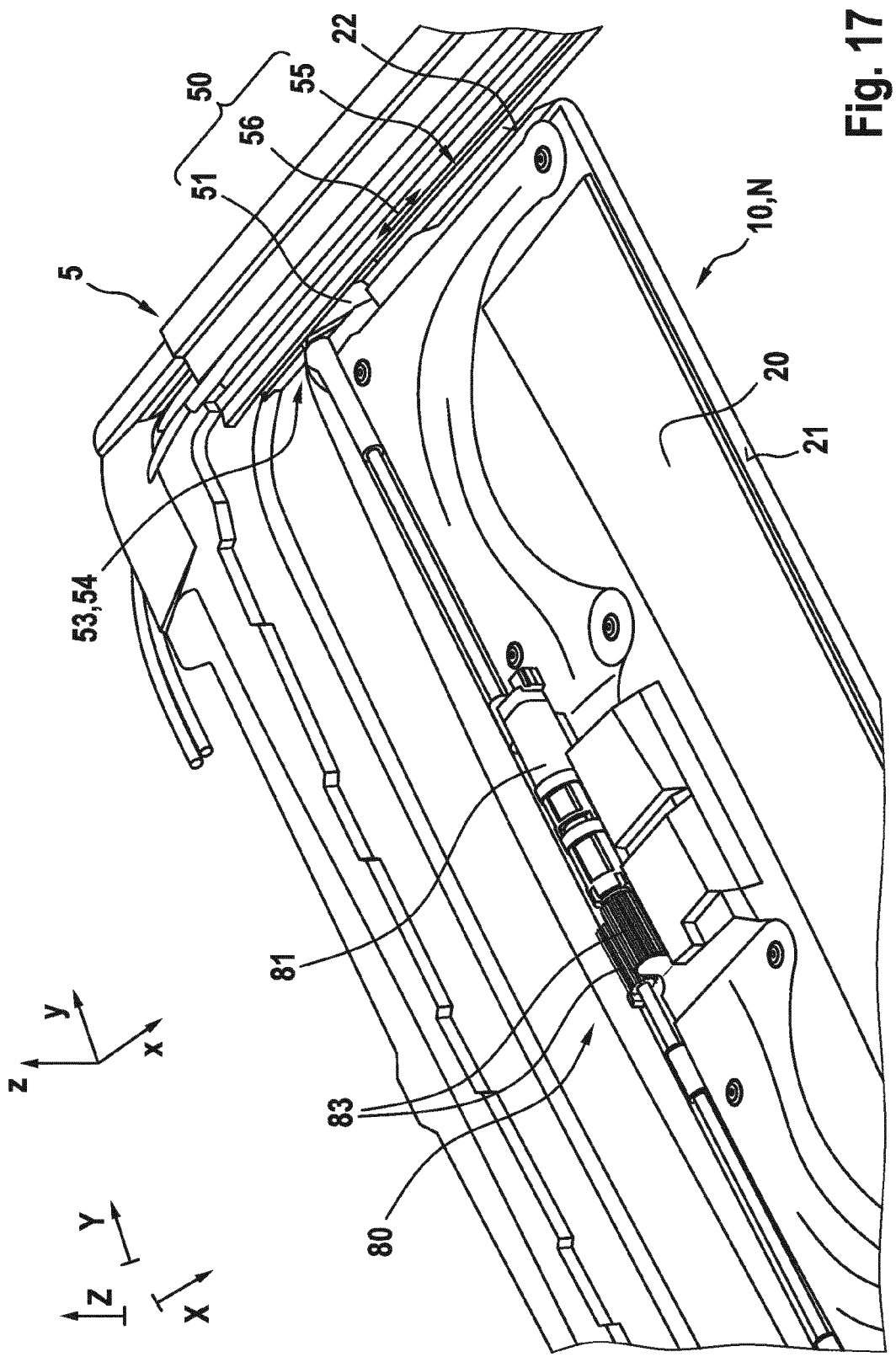

FIGS. 13 and 14 show a conventional vehicle 1' comprising a roof roller blind 8 with a drive 9 consisting of a motor 9-1 and drive means 9-2 in guide rails 55 and/or a vehicle 1 according to the invention in which the roof roller blind 8 is combined with a display device according to the invention, wherein this display device is located in FIG. 14 in the non-use position of the display unit 20 parallel to the roof liner 5.

FIG. 15 shows in greater detail the region of the drive units 9 for the roof roller blind 8, on the one hand, and 80 for the display device 10, on the other hand.

FIGS. 16 to 19 show in schematic and perspective side views features of a display device 10 together with a first drive 81 of the drive unit 80 for performing the swiveling movement. According to the basic point of the invention, the drive 81 for the swiveling movement is formed from a corresponding motor which drives the shaft 64 via a gear mechanism as drive means 83. The first ends 54-1 of the second levers 54 are attached fixedly in terms of rotation to the ends of the shaft, so that when the shaft 64 is rotated these levers swivel about their swivel axes 54-5. Via the coupling to the first levers 53 of the pairs of levers 53, 54, namely via the first ends 53-1 thereof, this leads to a controlled swiveling of the display unit 20 about the coinciding axes 61, 53-6.

Figure 18:
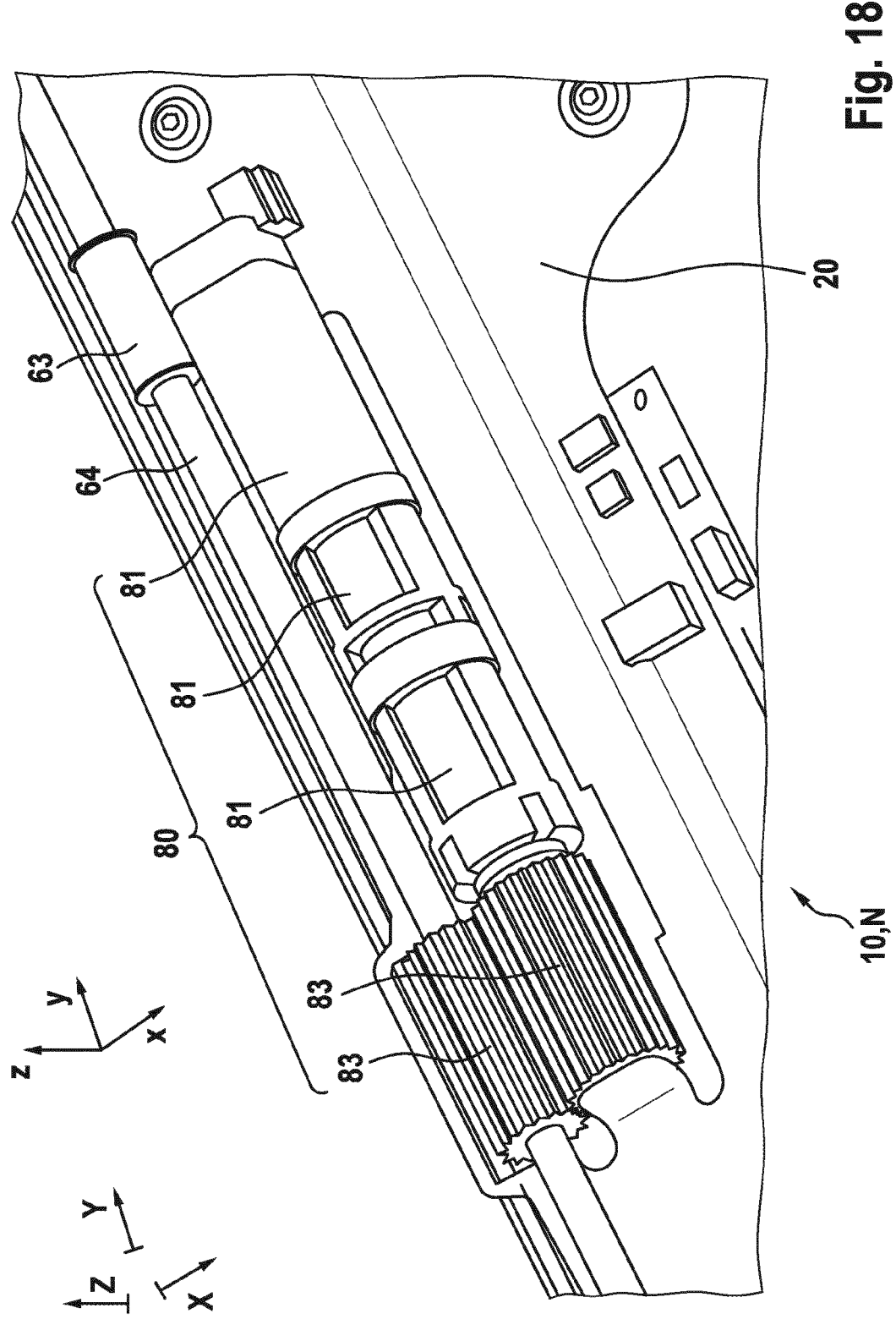
Figure 19:
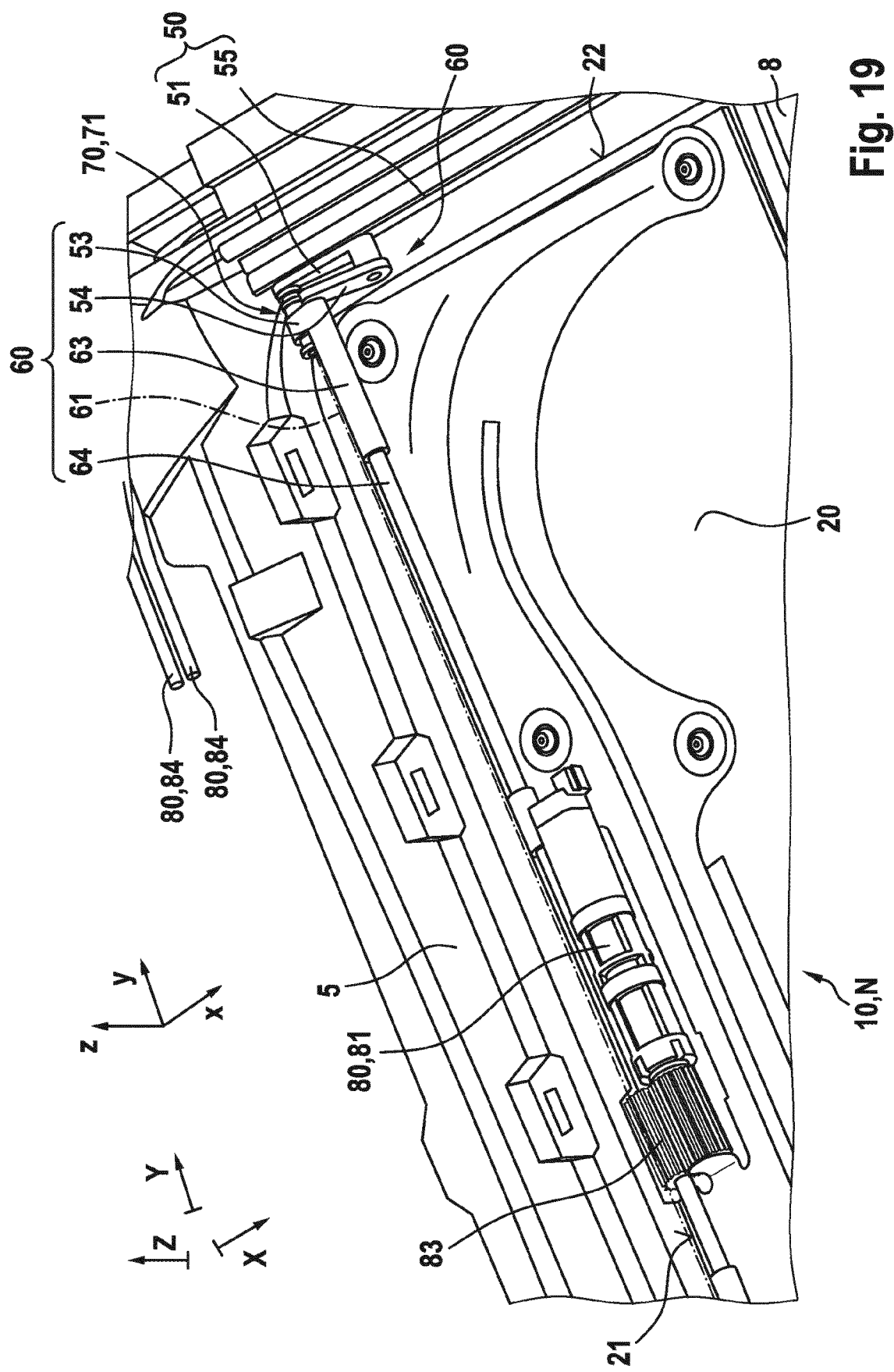

From FIGS. 18 and 19 it is visible that the shaft 64 to which the second levers 54 with their first ends 54-1 are attached fixedly in terms of rotation, runs so as to be rotatably mounted in a hollow shaft 63, wherein the hollow shaft 63, on the one hand, is connected fixedly in terms of rotation to the display unit 20 and, on the other hand, fixedly in terms of rotation to the first ends of the first levers 53 and may be constructed in multiple pieces or divided into portions.

Figure 20:
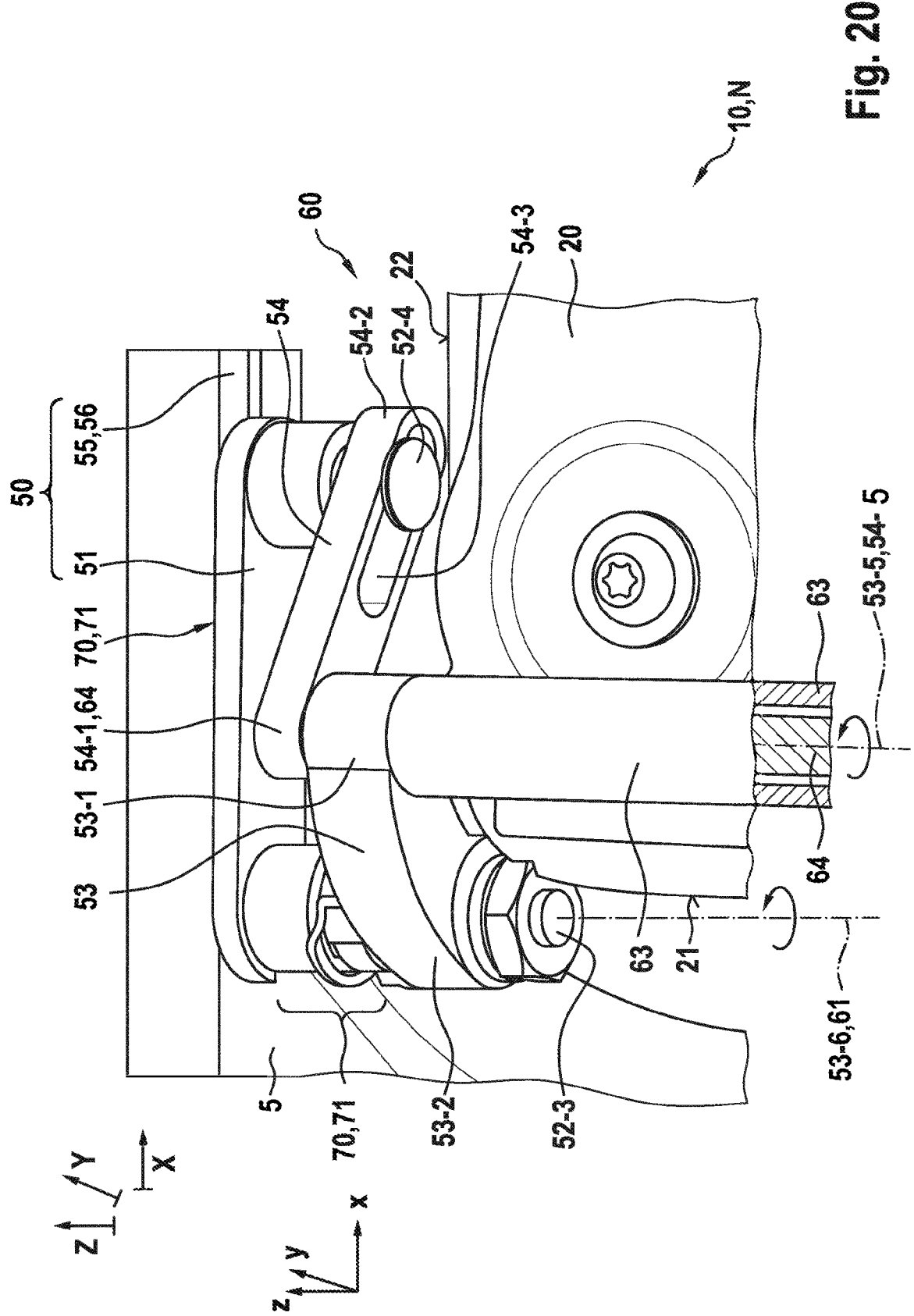
Figure 21:
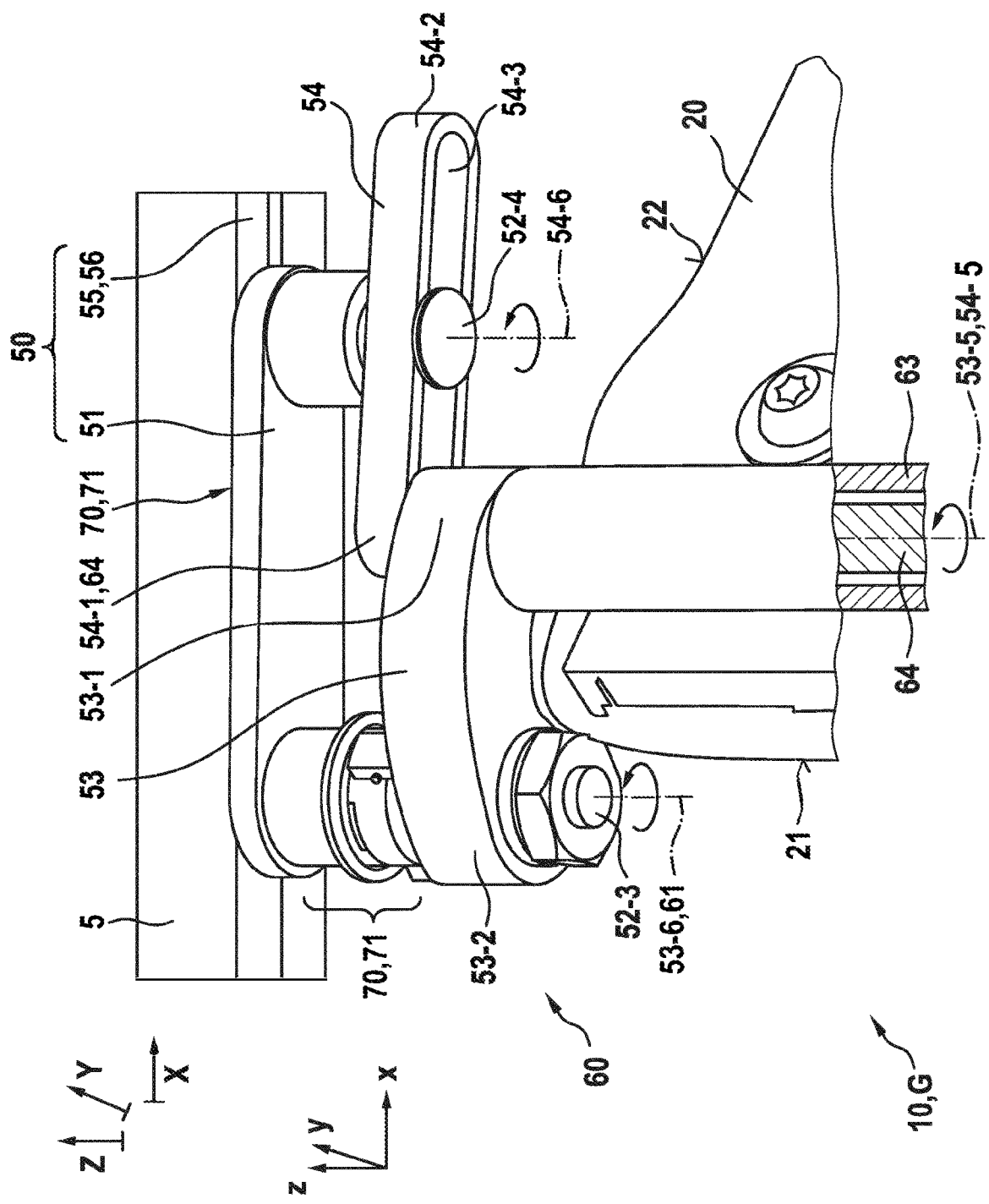

FIGS. 20 to 22 show in a schematic and perspective side view a practical embodiment of the display device according to the invention 10 regarding the configuration of the pairs of levers 53, 54 and the cooperation thereof.

Guide elements 51 are attached to the display unit 20 in the intersecting region between the transverse edge 21 and longitudinal edges 22, so as to be able to be moved in a translational manner as slides in guide rails 55 with guide tracks 56 so that a displacement of the display unit 20 in the longitudinal direction X of the underlying vehicle 1 may be carried out.

The attachment of the guide elements 51 is carried out such that a swiveling of the display unit 20 about a swivel axis 61 is also possible simultaneously or separately from the translational movement. The respective swivel axis 61 is defined by a specific construction of pairs of first and second levers 53 and 54 which are attached, on the one hand, to the respective guide element 51 and, on the other hand, to the display unit 20.

Via a hollow shaft 63 or portions of a hollow shaft 63 which are attached fixedly in terms of rotation to the display unit 20, first ends 53-1 of first levers 53 are also connected fixedly in terms of rotation to the display unit 20. The second ends 53-2 of the first levers 53 opposing the first ends 53-1 have a substantially rotatably mounted pin or journal 52-3 which is fastened, however, to the guide element 51. By this measure the respective first levers 53 and thus the display unit 20 are in principle able to be swiveled about the swivel axis 53-6 of the first pins or journals 52-3, so that the swivel axes 53-6 of the pins 53-2 form the swivel axis 61 of the display unit 20.

For stabilizing the pivoting movement, on the one hand, and also for the possibility of effecting the swiveling movement by motor, second swivel levers 54 are provided with first ends 54-1 and second ends 54-2 and namely as slotted levers with a slot 54-3 which, starting from the second end 54-2 of the second lever 54, extends in the direction of the first end 54-1 of the second lever 54, but does not extend as far as this. The slot 54-2 runs, therefore, in the main direction of extent or longitudinal direction of extent of the respective second lever 54.

A pin 52-4 is received in the slot 54-3 so as to be displaceable and rotatably mounted. This pin 52-4 of the second lever 54, however, is also connected to the guide element 51 and namely at a spatial distance from the mounting point of the pin 52-3 of the first lever 53.

The two pins or journals 52-3 and 52-4 have, therefore, a fixed spacing from one another on the guide element 51.

A shaft 64 which may function as drive shaft is attached to the first end 54-1 of the second lever 54. The shaft 64 is rotatably mounted in the hollow shaft 63 or in the portions thereof.

In connection with FIGS. 18 and 19 it is shown how the shaft 64—rotatably mounted in the hollow shaft 63—may be driven in rotation via a gear mechanism 83 of the drive unit 80. If the shaft 64 is driven in rotation by the drive 81, the second lever 54 swivels and, via the clutch, by means of the hollow shaft 63 overall a swiveling movement of the display unit 20 about the swivel axes 53-6 of the pins or journals 52-3 is produced at the two ends 53-2 of the first levers 53 and thus about the swivel axis 61 of the display unit 20 defined thereby. By means of the slot 54-3 a movement of the pin 52-4 of the second lever 54 is permitted, thus the slot functions as a type of "length compensation".

By the swiveling of the second levers 54 with the rotation of the shaft 64, the display unit 20 adopts the positions shown in FIGS. 20 to 22, namely the non-use position N shown in FIG. 20 and the use position in G shown in FIGS. 21 and 22, with various swivel angles in relation to the roof liner 5 of the vehicle 1.

In the case of an accident and, in particular, in the case of frontal collisions and rear-end collisions, it is important that the display device 10 is configured such that a display unit 20 which is swiveled out in a use position G is immediately swiveled back into the non-use position N, so that in the case of an accident a collision of an occupant 6 with the display unit 20 when the occupant 6 moves due to inertia is avoided.

To this end, according to a further feature of the present invention, different safety devices 70 are formed on the display device 10.

Accordingly, FIGS. 19 to 22 schematically show friction clutches 71 as a safety device 70 in the region of the pin 52-3 on the second ends 53-2 of the first levers 53.

Alternative or additional measures may be taken in combination with the pins 52-4 on the second ends 54-2 of the second levers 54, with the first drive 81 of the drive unit 80, and/or in combination with the guide of the guide elements 51 in the guide rails 55.

In principle a purely translational movement, a purely rotational movement, i.e. a swiveling movement or a combination formed therefrom, are contemplated as a deflection movement of the display unit 20.

The friction clutch is located, for example, on or in the drive shaft 64 and separates the slotted lever 54 from the drive unit 80. The drive unit 80 consisting of the motor and gear stages may, due to its design, be self-locking and would prevent or at least impede a swiveling in of the display 20 triggered by the mass inertia. The swiveling in of the display 20 due to a crash thus moves the drive shaft 64 with the slotted lever 54 but not the motor-gear mechanism unit.

The opening of the friction clutch may also permit a swiveling in of the display 20, not only in the case of a crash, but may also protect the mechanism or the display 20 if a customer manually attempts to fold in or twist the display 20 by force.

High forces may also be temporarily produced in the case of bumping into the display when boarding and disembarking.

LIST OF REFERENCE NUMERALS

1 Vehicle
2 Body
3 Interior
5 Roof liner
6 Rear occupant
8 Roof roller bind, roller blind
9 Roller blind drive
9-1 Motor
9-2 Drive means/brush cable/helix cable for roller blind 8
10 Display device
20 Display unit
21 Transverse edge
22 Longitudinal edge
30 Support
40 Display element, monitor, screen
50 Movement unit
51 Guide element, slide
52-3 Pin, journal
52-4 Pin, journal
53 (First) lever, swivel lever
53-1 (First) end of swivel lever 53 (on display unit 20)
53-2 (Second) end of swivel lever 53 (on a guide element 51)
53-5 Swivel axis on first end 53-1
53-6 Swivel axis on second end 53-2
54 (Second) lever, coupling lever, slotted lever
54-1 (First) end of coupling lever 54 (on display unit 20)
54-2 (Second) end of coupling lever 54 (on a guide element 51)
54-3 Slot
54-5 Swivel axis on first end 54-1
54-6 Swivel axis on second end 54-2
55 Guide rail
56 Guide track
60 Swivel unit
61 Swivel axis
63 Shaft for coupling lever 53 (as hollow shaft)
64 Shaft for slotted lever 54
70 Safety unit
71 Friction clutch
80 Drive unit
81 (First) drive/motor for swivel unit 60
82 (Second) drive/motor for translation/guide elements 51
83 (First) drive means/gear mechanism for swivel unit 60
84 (Second) drive means/brush cable/helix cable for guide elements 51
G Use position
N Non-use position
x Spatial direction
X Longitudinal direction of extent of vehicle 1
y Spatial direction
Y Transverse direction of extent of vehicle 1
z Spatial direction
Z Vertical direction of extent of vehicle 1

What is claimed is:

1. A display device for an interior of a vehicle, comprising:
a display unit that optically displays information; and
a swivel unit that swivels the display unit about a swivel axis between a non-use position parallel to a roof liner of the vehicle and a use position swiveled away from the roof liner of the vehicle, and that retains said display unit in the non-use position and/or in the use position,
wherein
the swivel unit comprises two pairs of coupled-together first and second levers,
for a swiveling of the first and second levers of a pair in relation to one another and about first ends thereof, the first ends thereof are connected to one another so as to be swivelable about a common swivel axis and are attached directly or indirectly to the display unit, and
the second ends thereof are attachable directly or indirectly to the roof liner of the vehicle.

2. The display device according to claim 1, wherein
a first end of one respective first lever of a pair is attached as a swivel lever fixedly in terms of rotation to the display unit and connected thereto at or in an intersecting region of a transverse edge and a longitudinal edge of the display unit, and
the intersecting region faces the rear of the vehicle in a mounted state of the display device in the vehicle and/or in the non-use position.

3. The display device according to claim 2, wherein
a first end of one respective second lever of a pair is rotatably attached as a coupling lever to the display unit and connected thereto and to the first end of an assigned first lever of the pair.

4. The display device according to claim 3, wherein
a second end of one respective first lever of a pair and/or a second end of one respective second lever of a pair in each case are configured so as to be swivelable about one respective swivel axis via one respective pin or journal which is fixed or rotatably mounted on the respective second end, with said swivel axes oriented:
(i) parallel to one another,
(ii) parallel to the swivel axes of the first ends of the levers,
(iii) parallel to the swivel axis of the display unit, and/or
(iv) parallel to the transverse edge of the display unit.

5. The display device according to claim 4, wherein
the swivel axis at the second end of one respective first lever coincides with the swivel axis of the display unit.

6. The display device according to claim 4, wherein
one respective second lever has a longitudinal direction of extent and a slot oriented in the longitudinal direction of extent for receiving a pin assigned to the second end of the second lever, and
the pin is displaceable in the slot in the longitudinal direction of extent of the one respective second lever and is rotatable about a pin axis defining a swivel axis assigned to the second end of the second lever perpendicular to the main direction of extent.

7. The display device according to claim 1, wherein
one respective second lever is attached in terms of rotation with its first end to a shaft, defining at least the swivel axis for the first end of the second lever, at one end of the shaft, and/or the two second levers of the two pairs of levers are connected together fixedly in terms of rotation and in identical orientation to one another by the two ends of the shaft, one respective first lever is attached fixedly in terms of rotation by its first end to a hollow shaft, defining at least the swivel axis for the first end of the first lever, at one of its ends, and/or the two first levers of the two pairs of levers are connected together by the two ends of the hollow shaft and connected fixedly in terms of rotation and in identical orientation to the display unit, and/or at least one part of the shaft is rotatably mounted in at least one part of the hollow shaft so that their axes coincide and form the swivel axes for the first ends of the first and second levers of the pairs of levers.

8. The display device according to claim 7, wherein the display device:
  (i) is configured with in each case a guide element, assigned to a pair of levers, wherein the second ends of the levers of the assigned pair of levers are attached to one respective guide element at a predetermined distance and so as to be able to swivel about the swivel axes, and
  (ii) the guide elements are configured:
    equal or substantially equal,
    as slides, and/or
    designed for a sliding movement in one respective guide rail.

9. The display device according to claim 8, wherein the display device:
  (iii) is configured with in each case a guide rail assigned to a guide element for attaching to the roof liner, with a guide track for receiving the assigned guide element and for the movement thereof in and along the guide track, and
  (iv) the guide rails are configured:
    as a pair,
    equal or substantially equal to one another,
    linear or substantially linear,
    oriented parallel to one another,
    oriented flush with one another relative to their respective first and second ends,
    in the mounted state of the display device on the vehicle, attached to a roof liner or in a region thereof, and/or
    in the mounted state of the display device on the vehicle, oriented parallel to a longitudinal direction of extent of the vehicle.

10. The display device according to claim 1, wherein the display unit is configured:
  with a substantially rectangular design,
  in the mounted state of the display device on the vehicle, with transverse edges oriented parallel to a transverse direction of extent of the vehicle, and/or
  in the mounted state of the display device on the vehicle, with longitudinal edges oriented parallel to a longitudinal direction of extent of the vehicle, and/or
  wherein the first levers and/or the second levers in each case and relative to one another, are configured:
    as a pair,
    equal or substantially equal to one another,
    with equal length,
    linear or substantially linear,
    oriented parallel to one another, and/or
    oriented flush with one another.

11. The display device according to claim 8, further comprising:
  a drive unit which is configured for controlled swiveling of the display unit about a swivel axis, and
  wherein the drive unit comprises a first controllable drive and a drive means mechanically coupled or couplable thereto and to the second levers in the manner of a gear mechanism, for swiveling the second levers and/or the shaft of the second levers about the swivel axis thereof.

12. The display device according to claim 11, wherein
  the display device is designed for driving the guide elements for a common, equal and/or translational movement of the guide elements in one respective guide rail, and/or
  the display device is configured with a controllable drive and with a drive means mechanically coupled or couplable thereto and assigned to the guide elements, wherein the drive means is configured in the form of a brush cable or helix cable which is designed for a meshing engagement by the guide elements for the movement thereof.

13. The display device according to claim 12, wherein
  a friction clutch and/or brake is configured, with a backstop, on or in a guide element, between a guide element and an assigned guide rail, in a region of a drive of the second levers, in a region of the first and/or second levers themselves, and/or with a predetermined holding force as a target holding force such that when the target holding force is exceeded, one respective guide element is moved following the acting force in one respectively assigned guide rail and/or a swiveling movement results, following the acting force back into the non-use position of the display unit,
  wherein the target holding force has a value which corresponds to an acceleration of 10 g.

14. A vehicle, comprising:
  a body;
  an interior formed by the body with a roof liner; and
  a display device attached to or in the roof liner, the display device comprising:
    a display unit that optically displays information; and
    a swivel unit that swivels the display unit about a swivel axis between a non-use position parallel to a roof liner of the vehicle and a use position swiveled away from the roof liner of the vehicle, and that retains said display unit in the non-use position and/or in the use position,
  wherein
    the swivel unit comprises two pairs of coupled-together first and second levers,
    for a swiveling of the first and second levers of a pair in relation to one another and about first ends thereof, the first ends thereof are connected to one another so as to be swivelable about a common swivel axis and are attached directly or indirectly to the display unit, and
    the second ends thereof are attached directly or indirectly to the roof liner of the vehicle.

15. The vehicle according to claim 14, further comprising:
  two guide rails of the display device attached to or in the roof liner such that they extend flush with equal length and parallel to one another in a longitudinal direction of extent of the vehicle, on or, relative to a transverse direction of extent of the vehicle, in external regions of the roof liner, and
  two guide elements of the display device received in the guide rails such that a corresponding first transverse edge of the display unit of the display device, the first guide element being attached to a region thereof, is arranged parallel to the transverse direction of extent of the vehicle and relative to the longitudinal direction of extent of the vehicle in the direction of a side facing the rear of the vehicle.

\* \* \* \* \*